US009919586B2

(12) United States Patent
Belzons

(10) Patent No.: US 9,919,586 B2
(45) Date of Patent: Mar. 20, 2018

(54) AIR NOZZLE DEVICE FOR A VEHICLE

(71) Applicant: Ningbo Geely Automobile Research & Development Co. Ltd, Ningbo (CN)

(72) Inventor: Lionel Belzons, Nödinge (SE)

(73) Assignee: Ningbo Geely Automobile Research & Development Co., Ltd, Ningbo (CN)

(*) Notice: Subject to any disclaimer, the term of this patent is extended or adjusted under 35 U.S.C. 154(b) by 0 days.

(21) Appl. No.: 15/285,385

(22) Filed: Oct. 4, 2016

(65) Prior Publication Data
US 2017/0021701 A1 Jan. 26, 2017

Related U.S. Application Data

(63) Continuation of application No. PCT/EP2015/076156, filed on Nov. 10, 2015.

(30) Foreign Application Priority Data

Nov. 10, 2014 (SE) .................................... 1451348

(51) Int. Cl.
B60H 1/34 (2006.01)

(52) U.S. Cl.
CPC ... *B60H 1/3421* (2013.01); *B60H 2001/3478* (2013.01)

(58) Field of Classification Search
CPC . B60H 1/3421; B60H 2001/3478; B60H 1/34
(Continued)

(56) References Cited

U.S. PATENT DOCUMENTS 6,533,655 B2 * 3/2003 Demerath ............ B60H 1/3421
454/155
6,736,719 B1 * 5/2004 Gehring ............... B60H 1/3421
454/143
(Continued)

FOREIGN PATENT DOCUMENTS

DE 102007019602 B3 3/2008
DE 202010000445 U1 7/2010
(Continued)

OTHER PUBLICATIONS

PCT Search Report dated Sep. 2, 2016 for PCT application No. PCT/EP2015/076156, 5 pages.
(Continued)

Primary Examiner — Gregory Huson
Assistant Examiner — Dana Tighe
(74) Attorney, Agent, or Firm — Lee & Hayes, PLLC

(57) ABSTRACT

The present invention relates to an air nozzle device (10) for a vehicle (1) comprising a housing (11) defining an interior volume and having an air inlet (12) at one side, an air discharge opening (14) at a second side and an air flow channel (18) through the housing (11) for transporting a flow of air between the air inlet and the air discharge opening, the device (10) further comprising a moveable operating member (30), a shutoff mechanism (40) and an air flow adjustment arrangement (20), said shutoff mechanism (40) being pivotably connected to said housing and configured to regulate the air flow and said air flow adjustment arrangement (20) being pivotably connected to said housing and configured to adjust the direction of the air flow in a longitudinal direction X and in a vertical direction Z, wherein said operating member (30) comprising a user-actuated manual mechanism (32), a first linkage member (34) and a second linkage member (36), wherein said user-actuated manual mechanism (32) is arranged down- (Continued)

stream of said air flow adjustment arrangement (20) to permit manual operation of the air flow adjustment arrangement (20) and the shutoff mechanism (40) from the outside of the device.

20 Claims, 16 Drawing Sheets

(58) Field of Classification Search
USPC .................................. 454/155, 152, 154, 143
See application file for complete search history.

(56) References Cited

U.S. PATENT DOCUMENTS

| | | | |
|---|---|---|---|
| 6,780,098 B2* | 8/2004 | Nishida | B60H 1/3414 |
| | | | 454/155 |
| 6,863,603 B2* | 3/2005 | Demerath | B60H 1/3421 |
| | | | 454/155 |
| 6,893,338 B2* | 5/2005 | Katagiri | B60H 1/3421 |
| | | | 454/155 |
| 7,029,390 B2* | 4/2006 | Karadia | B60H 1/3421 |
| | | | 454/152 |
| 2013/0078900 A1 | 3/2013 | Zalan | |

FOREIGN PATENT DOCUMENTS

| | | |
|---|---|---|
| DE | 102011050435 A1 | 11/2012 |
| DE | 202013100257 U1 | 3/2013 |
| DE | 102013102866 B3 | 6/2014 |
| EP | 1712384 A2 | 10/2006 |
| FR | 2809349 A1 | 11/2001 |

OTHER PUBLICATIONS

PCT International-Type Search Report dated Nov. 5, 2015 for National application No. 1451348-5, 6 pages.

* cited by examiner

AIR NOZZLE DEVICE FOR A VEHICLE

RELATED APPLICATION

This application is a continuation of PCT International Application No. PCT/EP2015/076156, filed Nov. 10, 2015, which claims foreign priority to Sweden Application No. SE 1451348-5, filed on Nov. 10, 2014, both of which are incorporated herein by reference.

TECHNICAL FIELD

The invention relates to an air nozzle device for a vehicle. The invention also relates to a vehicle compartment member such as dashboard, door trim, console or the like, comprising an air nozzle device. Moreover, the invention relates to a vehicle comprising a vehicle compartment member having an air nozzle device.

The invention can be arranged in a dashboard, a door trim, a rear seat console or the like. Although the invention will be described in relation to a car, the invention is not restricted to this particular vehicle, but may as well be installed in other type of vehicles such as minivans, recreational vehicles, off-road vehicles, trucks, buses or the like.

BACKGROUND ART

In the field of air valves and ventilation systems, there is an increasing demand for improving the robustness and operation of the components. Ventilation systems for vehicles are increasingly complex as the demands on the degree of control of such systems increase. Heating, ventilation and air conditioning (HVAC) systems are typically used to control the environment in a vehicle such that desired interior conditions set by the operator are maintained irrespective of the exterior environment. The vehicle air ventilation system is typically connected to one or several air valves, vents, nozzles or the like in order to discharge a flow of air within a vehicle compartment. In many systems, the ventilation system is connected to the air valve via an air duct.

Furthermore, the air valve is often installed in a vehicle compartment member such as a dashboard, and thereby defines the interface between the ventilation system and the vehicle compartment.

Depending on the wishes of the passenger in the vehicle, the air valve may be adjusted in the horizontal direction and/or the vertical direction in order to discharge the air from the air valve in different directions.

One example of an air nozzle is disclosed in WO 2008/077655 A1, in which a con-shaped air directing member is arranged to direct the air flow from the air outlet opening. In addition, the air nozzle comprises a slider and a plug formed on the slider to cover an air inlet opening. The slider is further moveable in axial direction of the device in order to open and close the air inlet opening by means of the plug. The slider is provided with a manipulator, which is movable in the axial direction and rotational about a longitudinal axis of the slider.

However, due to an increasing demand for reducing weight and size of the components making up the device and the system, it is often required to keep a balance between the functions provided by the device and the size of the air nozzle device.

Thus, it has been observed that there is a demand for an advanced air nozzle device which is capable of meeting the requirements as to size and available space in a vehicle compartment member, such as a dashboard, while providing good adjustment possibilities to the user.

SUMMARY OF THE INVENTION

A general object of the present invention is to provide a multi-functional air nozzle device for a vehicle which is user-friendly, yet compact and robust.

This and other objects, which will become apparent in the following, are accomplished by an air nozzle device for vehicle as defined in the accompanying independent claim. Details of some example embodiments and further optional features are recited in the associated dependent claims.

According to a first aspect of the present invention, there is provided an air nozzle device for a vehicle which comprises a housing defining an interior volume and having an air inlet at one side, an air discharge opening at a second side and an air flow channel through the housing for transporting a flow of air between the air inlet and the air discharge opening. The device further comprises a moveable operating member, a shutoff mechanism and an air flow adjustment arrangement. The shutoff mechanism is configured to regulate the air flow. The air flow adjustment arrangement is pivotably connected to the housing and configured to adjust the direction of the air flow in a horizontal (i.e., transverse) direction and in a vertical direction. Moreover, the operating member comprises a user-actuated manual mechanism, a first linkage member and a second linkage member.

The first linkage member is connected to the user-actuated manual mechanism at one end and the second linkage member at a second end. In addition, the first linkage member comprises a channel or groove to accommodate a part of a guiding pin of the air flow adjustment arrangement, wherein the channel or groove extends at least partly in the longitudinal direction to permit a movement of the first linkage member along the longitudinal direction X independently of the position of the air flow arrangement, while an adjustment of the air flow arrangement is effected by a movement of the first linkage member in the transverse direction Y independently of the position of the shutoff mechanism.

Furthermore, the first linkage member comprises a linking pin arranged at the second end. Also, the second linkage member comprises a channel or groove to accommodate a part of the linking pin of the first linkage member, wherein the channel or groove extends at least partly in the vertical direction Z to permit a movement of the first linkage member along the vertical direction Z independently of the position of the shutoff mechanism, while a movement of the first linkage member in the longitudinal direction X is translated into a movement of the second linkage member to effect a regulation of the air flow by the shutoff mechanism independently of the position of the air flow arrangement. Moreover, the user-actuated manual mechanism is arranged downstream of the air flow adjustment arrangement to permit manual operation of the air flow adjustment arrangement and the shutoff mechanism from the outside of the device. In this context, the outside of the device typically refers to outside the second side of the device, as seen in the longitudinal direction.

In this way, it becomes possible to provide a multifunctional air nozzle device in the sense that the configuration of the device allows for an independent adjustment of the air flow in the vertical direction, an independent adjustment of the air flow in the transverse direction Y and an independent regulation of the air flow level. In this manner, the first linkage member is movably arranged to the second linkage member such that a movement of the shutoff mechanism is effected by a movement of the operating member in a longitudinal direction X and an adjustment of the air flow adjustment arrangement is effected by a movement of the operating member in a transverse direction Y and/or vertical direction Z depending on horizontal or vertical air flow adjustment. To this end, the device provides a multi-functional solution which is both compact and robust while allowing for an integrated push/pull function via the operating member that is operable from the outside of the device.

The air nozzle device is compact and robust in the sense that the device can be installed in a vehicle compartment member such as a dashboard without any further modifications of the dashboard more than providing a space of the device, and without any further installations of a separate user-actuated mechanism since the user-actuated manual mechanism is directly connected to a part of the device and capable of being manipulated in a convenient manner by the user to effect a regulation and/or adjustment by moving the mechanism in the longitudinal, transverse and/or the vertical direction.

In one example embodiment, the direction of the air flow in the transverse direction Y is adjusted by means of a horizontal air flow adjustment mechanism and the direction of the air flow in the vertical direction Z is adjusted by means of a vertical air flow adjustment mechanism. Accordingly, in one example embodiment, the air flow adjustment arrangement comprises a vertical air flow adjustment mechanism for adjusting the air flow in the vertical direction Z and a horizontal air flow adjustment mechanism for adjusting the air flow in the transverse direction Y.

By a manipulation of the operating member via the user-actuated manual mechanism, the user-actuated manual mechanism of the operating member is capable of independently adjusting the vertical air flow adjustment mechanism by a movement of the first linkage member along the vertical direction Z, independently adjusting the horizontal air flow adjustment mechanism by a movement of the first linkage member along the transverse direction Y, and independently regulating the air flow via the shutoff mechanism by a movement of the operating member along the longitudinal direction X.

In contrast to hitherto known air nozzle solutions, which only allows for a regulation of the air flow between a closed position to an open position, i.e. from 0 to 100% air flow discharge, when the direction of the air flow adjustment is in a nominal position, the invention provides an air nozzle device which is capable of regulating the air flow between a closed position to an open position in all available positions of the air flow directing adjustment arrangement, e.g. via the horizontal air flow adjustment mechanism and the vertical air flow adjustment mechanism. In other words, the vertical air flow adjustment and the horizontal air flow adjustment can be controlled independently of the position of the air regulation mechanism, i.e. the shutoff mechanism.

In addition, the invention provides the possibility of installing the air nozzle device either in a circular cross-sectional housing or in a rectangular cross-sectional housing.

To this end, the device provides a multi-functional solution which is both compact and robust while allowing for an integrated push/pull function via the operating member that is operable from the outside of the device. When the air flow adjustment arrangement comprises the vertical air flow adjustment mechanism for adjusting the air flow in the vertical direction Z and the horizontal air flow adjustment mechanism for adjusting the air flow in the transverse direction Y, any one of the vertical air flow adjustment mechanism, the horizontal air flow adjustment mechanism (i.e. the air flow adjustment arrangement) and the shutoff mechanism can be independently operated within the device. Accordingly, the device provides a multi-functional solution in the sense that the air regulation, the vertical air flow adjustment and the horizontal air adjustment can be independently controlled, or adjusted.

In an example embodiment when the air flow adjustment arrangement comprises the vertical air flow adjustment mechanism for adjusting the air flow in the vertical direction Z and the horizontal air flow adjustment mechanism for adjusting the air flow in the transverse direction Y, the first linkage member comprises the channel or groove to accommodate a part of the guiding pin of the horizontal air flow adjustment mechanism. Thus, the channel or groove of the first linkage member extends at least partly in the longitudinal direction X to permit a movement of the first linkage member along the longitudinal direction X independently of the position of the horizontal air flow adjustment mechanism, while an adjustment of the horizontal air flow adjustment mechanism is effected by a movement of the first linkage member in the transverse direction Y independently of the position of the shutoff mechanism.

To this end, the term independently typically refers to the principle that one component (e.g. the horizontal air flow adjustment), or several components, can be maintained in its position when another different component (e.g. the shutoff mechanism) is adjusted via the operating member. As an example, the horizontal air flow adjustment mechanism can be maintained in its position, since the guiding pin of the horizontal air flow adjustment mechanism is freely movable in the longitudinal direction X of the recess of the first linkage member. In other words, the position of the horizontal air flow adjustment mechanism is unaffected by an adjustment of the shutoff mechanism (by a movement of the first linkage member and second linkage member).

Moreover, when the air flow adjustment arrangement comprises the vertical air flow adjustment mechanism for adjusting the air flow in the vertical direction Z and the horizontal air flow adjustment mechanism for adjusting the air flow in the transverse direction Y, the channel or groove of the second linkage member extends at least partly in the vertical direction Z to permit a movement of the first linkage member along the vertical direction Z independently of the position of the shutoff mechanism, while a movement of the first linkage member in the longitudinal direction X is translated into a movement of the second linkage member to effect a regulation of the air flow by the shutoff mechanism independently of the position of the vertical air flow adjustment mechanism and the position of the horizontal air flow adjustment mechanism.

As an example, the shutoff mechanism is maintained in its position, since the linking pin is freely movable in the vertical direction Z of the recess of the second linkage member. In other words, the position of the shutoff mechanism is unaffected by an adjustment of the vertical air flow adjustment mechanism and the horizontal air flow adjustment mechanism. That is, by an adjustment of the first linkage member along the transverse direction Y and/or by an adjustment of the user-actuated manual mechanism about a transverse axis.

Accordingly, by the principle of the invention, when the air flow adjustment arrangement comprises the vertical air flow adjustment mechanism and the horizontal air flow adjustment mechanism, the user-actuated manual mechanism of the operating member is capable of independently adjusting the vertical air flow adjustment mechanism by a movement of the first linkage member along the vertical direction Z, independently adjusting the horizontal air flow adjustment mechanism by a movement of the first linkage member along the transverse direction Y, and independently regulating the air flow via the shutoff mechanism by a movement of the operating member along the longitudinal direction X.

In this context of the invention, the term "independently" typically refers to the principle that one component (e.g. the horizontal air flow adjustment) can be maintained in its position when another component (e.g. the shutoff mechanism) is adjusted via the operating member.

In an example embodiment, the user-actuated manual mechanism is slidably engaged to the air flow arrangement and movable along the longitudinal direction X and the transverse direction Y upon operation of a user.

In an example embodiment, the user-actuated manual mechanism is slidably engaged to the vertical air flow adjustment mechanism and movable along the longitudinal direction X and the transverse direction Y upon operation of a user.

In an example embodiment, the first linkage member is arranged through a passage of the air flow arrangement and connected to the second linkage member upstream from said air flow arrangement.

In an example embodiment, the vertical air flow adjustment mechanism is independently pivotably connected to the housing via at least one pivoting connection configured to permit the vertical air flow adjustment mechanism to pivot about a transverse pivot axis.

In an example embodiment, the vertical air flow adjustment mechanism comprises a set of spaced apart air directing elements in the form of blades or flanges pivotably arranged about the pivoting connection(s).

In an example embodiment, the user-actuated manual mechanism is slidably engaged to the vertical air flow adjustment mechanism to permit operation of the user-actuated manual mechanism along the longitudinal direction X and the transverse direction Y, upon operation of a user, independently of the position of the vertical air flow adjustment, while an adjustment of the vertical air adjustment is effected by a movement of the manual member in the vertical direction Z.

Typically, the horizontal air flow adjustment mechanism is independently pivotably connected to the housing via at least one pivoting connection configured to permit the horizontal air flow adjustment mechanism to pivot about a vertical pivot axis.

In an example embodiment, the horizontal air flow adjustment mechanism comprises a set of spaced apart air directing elements in the form of blades or flanges pivotably arranged about the pivoting connection(s).

Typically, the guiding pin of the air flow adjustment arrangement is arranged on the horizontal air flow adjustment mechanism. Thus, in one example embodiment, the horizontal air flow adjustment comprises the guiding pin.

In an example embodiment, the shutoff mechanism is configured to move between an open position, defining a passage for the air flow in the air flow channel, and a closed position, defining an essentially air tight configuration against (or with) the inner surfaces of the housing, upon a movement of the moveable operating member in a longitudinal direction.

In other words, the shutoff mechanism is typically operable between an open position, in which essentially all air upstream from the shutoff mechanism passes through the shutoff mechanism, and a closed position, in which the shutoff mechanism forms an air tight configuration with an inner surface of the housing, upon movement of the moveable operating member in a longitudinal direction X.

In an example embodiment, the shutoff mechanism is connected to the housing via the operating member. As an example, the shutoff mechanism is connected to the housing via the operating member by means of rotational arranged supporting member extending between the operating member and the inner surface of the housing.

In an example embodiment, the shutoff mechanism is pivotably connected to the housing.

Typically, the shutoff mechanism is connected to the housing via the operating member.

In an example embodiment, the shutoff mechanism comprises a set of blades being moveable between an open position in which the set of blades forms a passage for the air flow in the air flow channel and a closed position in which the set of blades are adapted to form an essentially air tight configuration against (or with) the inner surfaces of the housing.

Typically, the user-actuated manual mechanism of the operating member is capable of open/close the shutoff mechanism via a movement of the first linkage member and the second linkage member along the longitudinal direction X.

Typically, the user-actuated manual mechanism of the operating member is capable of independently adjusting the direction of the air flow via the air flow adjustment arrangement, while maintaining the position of the shutoff mechanism, by a movement of the first linkage member along the transverse direction Y.

In one example embodiment, when the air flow adjustment arrangement comprises a vertical air flow adjustment mechanism and a horizontal air flow adjustment mechanism, the user-actuated manual mechanism of the operating member is capable of independently adjusting the vertical air flow adjustment mechanism by a movement of the first linkage member along the vertical direction Z, independently adjusting the horizontal air flow adjustment mechanism by a movement of the first linkage member along the transverse direction Y, and independently regulating the air flow via the shutoff mechanism by a movement of the operating member along the longitudinal direction X.

The invention also relates to a vehicle compartment member such as dashboard, door trim, console or the like, wherein the vehicle compartment member comprises an air nozzle device according to the aspect and/or any one of the example embodiments as mentioned above with respect to the first aspect of the invention, i.e. the aspects relating to the air nozzle device The invention also relates to a vehicle comprising vehicle compartment member according to any one of the aspects and/or example embodiments as mentioned above with respect to the vehicle compartment and/or the first aspect of the invention, i.e. the aspect relating to the air nozzle device.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The various example embodiments of the invention, including its particular features and example advantages, will be readily understood from the following illustrative and non-limiting detailed description and the accompanying drawings, in which.

DETAILED DESCRIPTION OF EXAMPLE EMBODIMENTS OF THE INVENTION

Figure 1A:
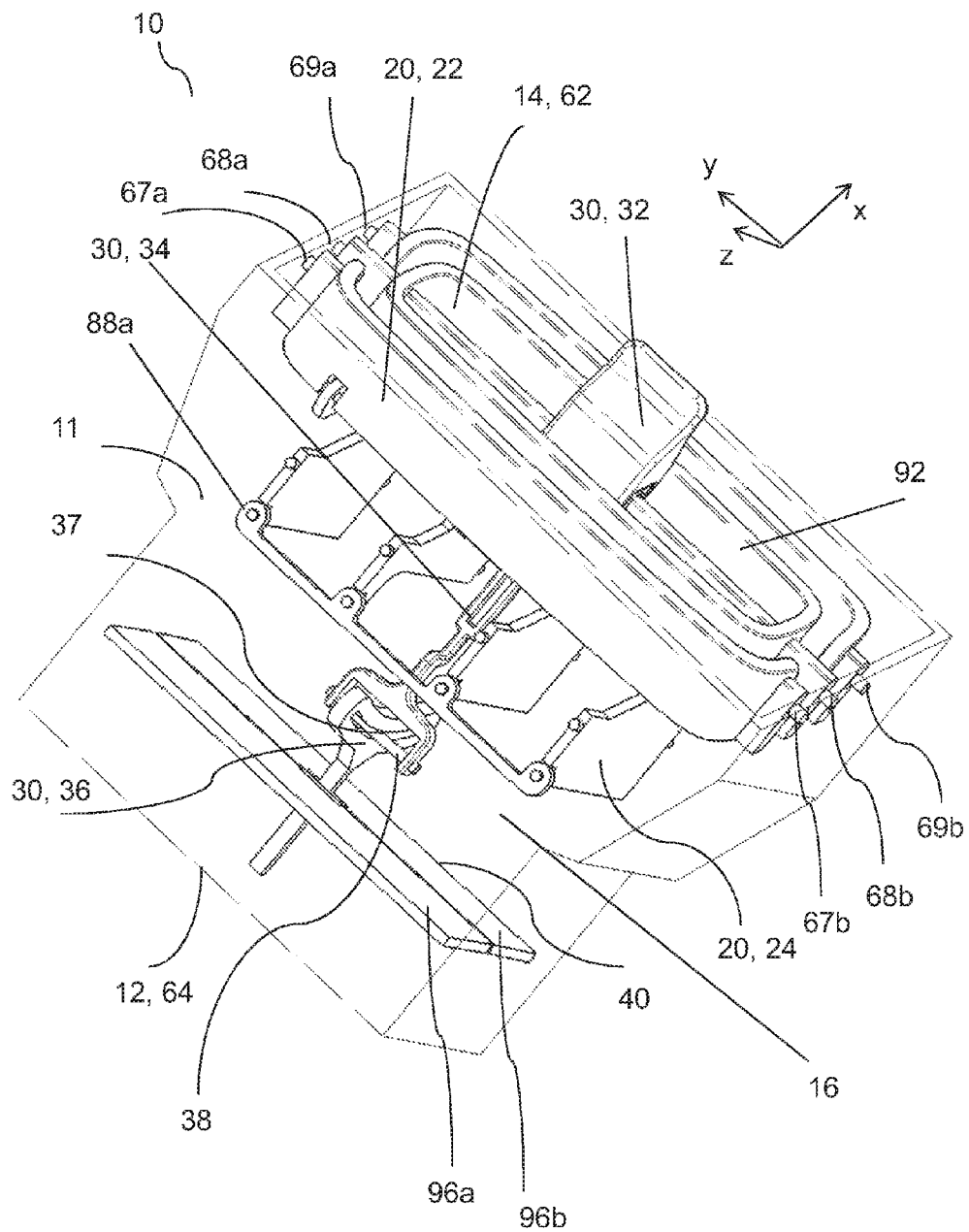
FIG. 1a is a perspective view of a first example embodiment of an air nozzle device for a vehicle according to the present invention, wherein the air nozzle device is in an assembled configuration.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present invention.

Referring now to the figures and FIG. 1a-1d in particular, there is depicted a vehicle air nozzle device to be installed in a vehicle compartment member in the form of a dashboard of a vehicle such as a car. Accordingly, the vehicle compartment is provided with an air nozzle device according to an example embodiment, as described hereinafter. The vehicle 1 (not shown) thus includes the vehicle compartment member in the form of a dashboard 100 (not shown) provided with an air nozzle device 10. The air nozzle device 10 is described in further detail below with reference to FIGS. 1a-1d, FIG. 2, FIGS. 3a-3j and FIG. 4. The vehicle 1 is provided in the form of a car. Moreover, the instrument panel 100 is arranged in a vehicle compartment of the car. The arrangement, components and functions of the dashboard (instrument panel) are well-known in the art, and is therefore not further described herein. In addition, it should be readily appreciated that an instrument panel (sometimes denoted as a dashboard) is only one example of several different vehicle compartment members, and it is therefore possible that the invention can be installed and arranged in other vehicle compartment members such as in a door trim, rear end of a floor console, B-pillar, tunnel console or the like. In addition, the vehicle compartment member can be arranged and installed in any type of vehicle such as a truck, bus and the like.

Figure 1B:
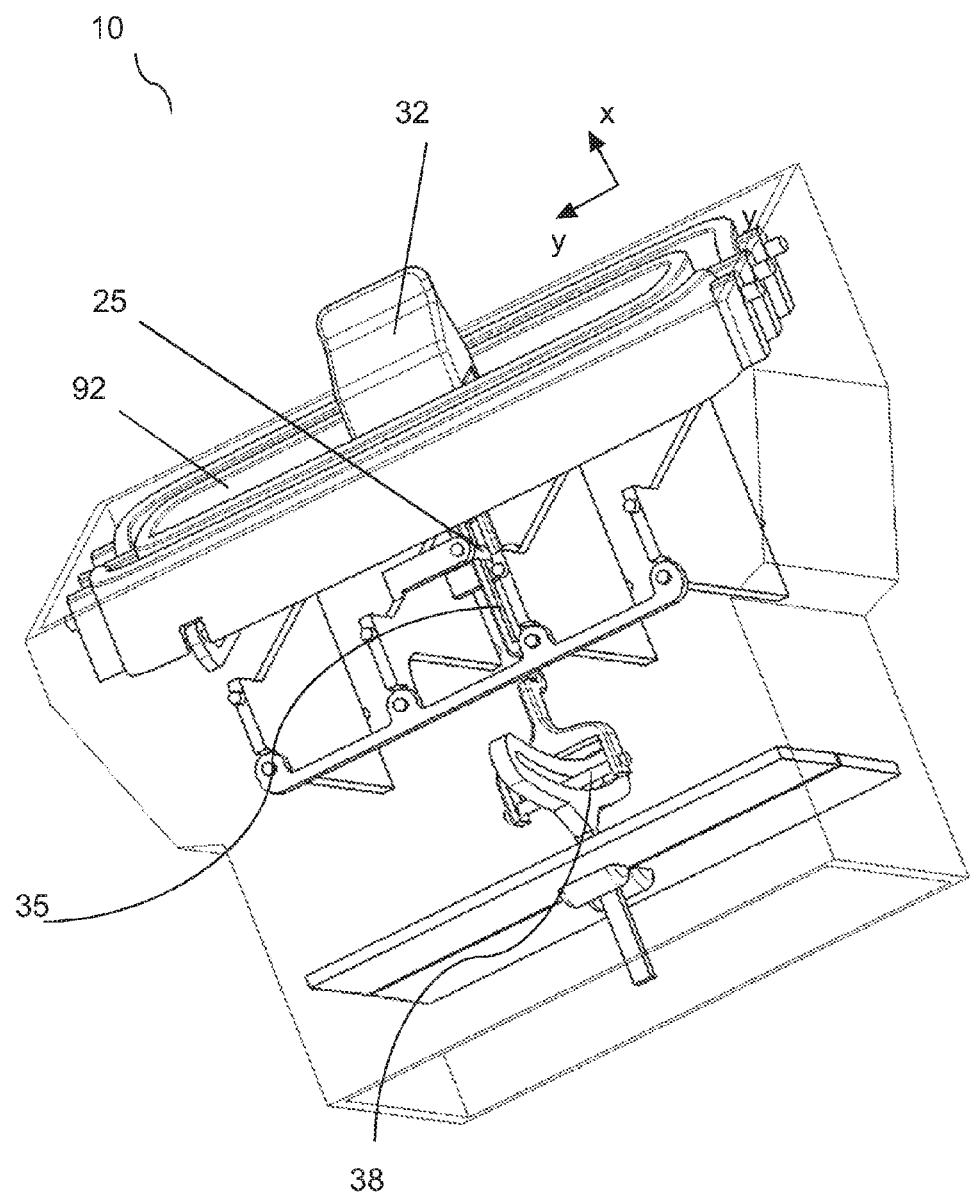
FIG. 1b is another perspective view of the first example embodiment of the air nozzle device in FIG. 1a, wherein the air nozzle device is in an assembled configuration.
Figure 1C:
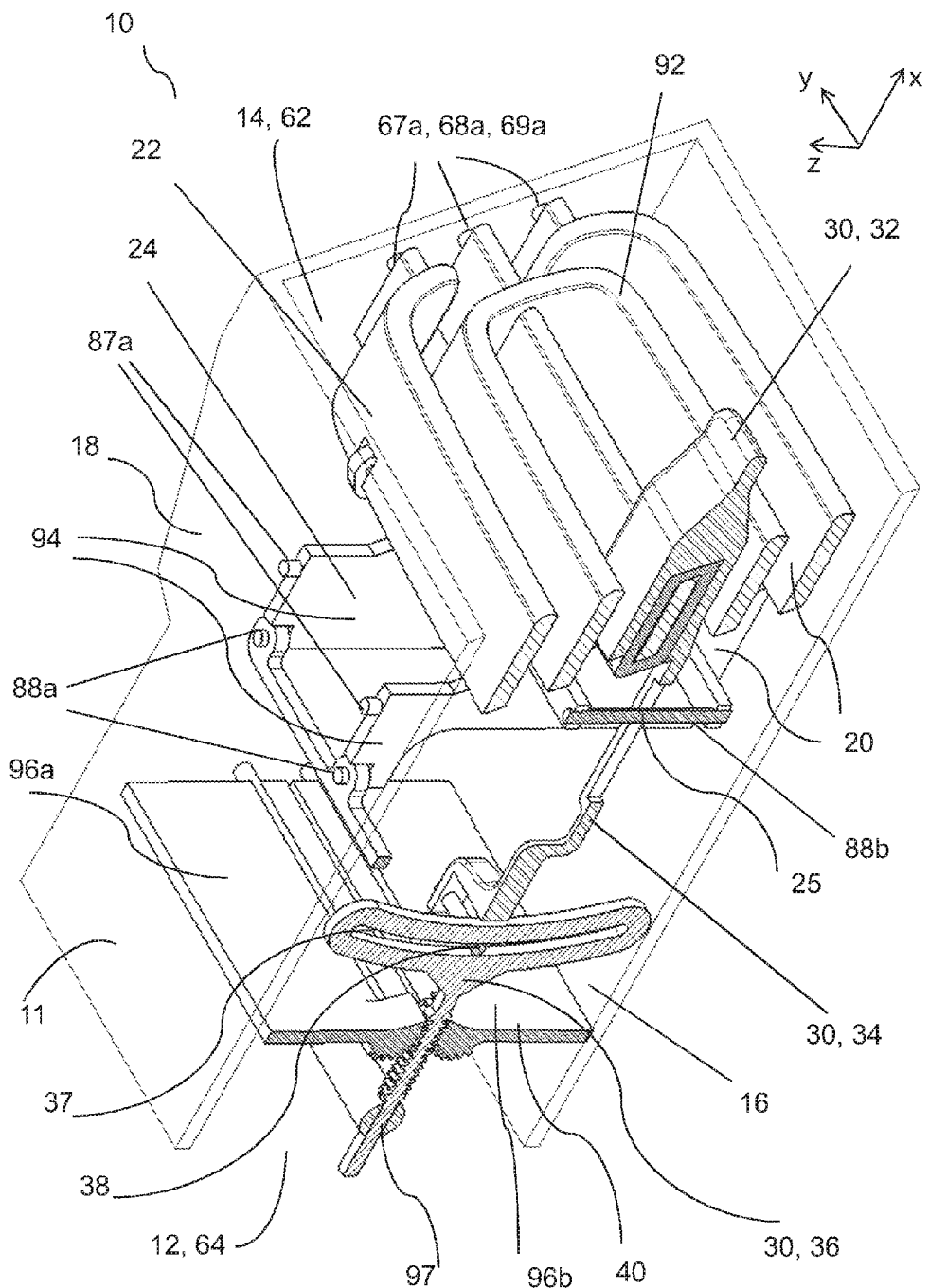
FIG. 1c is a cross-sectional view of the first example embodiment of the air nozzle device in FIG. 1a, wherein the air nozzle device is in an assembled configuration.
Figure 1D:
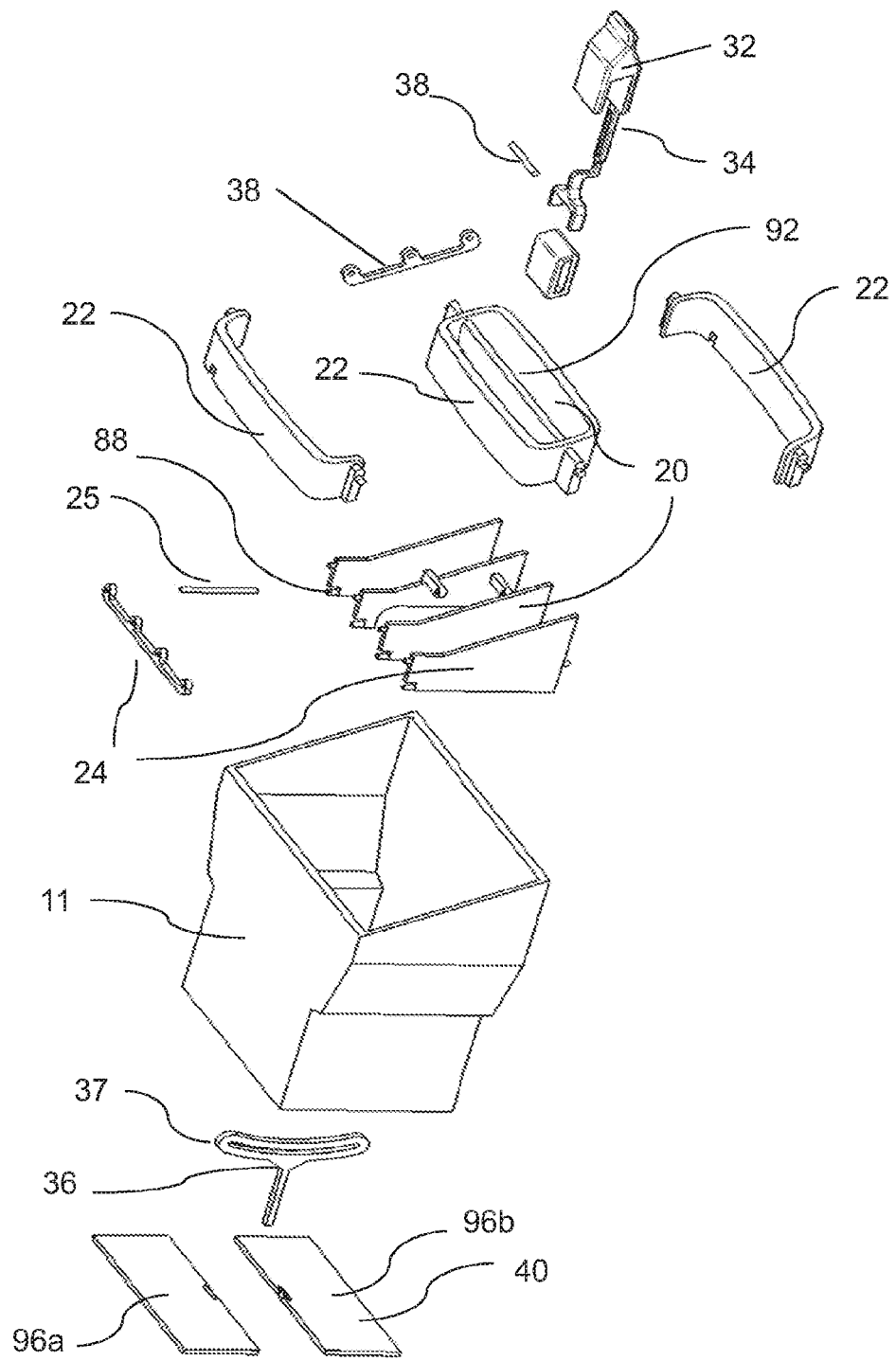
FIG. 1d is an exploded view of the first example embodiment of the air nozzle device in FIGS. 1a to 1c.

Turning now to FIGS. 1a to 1d, an example embodiment of an air nozzle device of a vehicle is illustrated. FIGS. 1a and 1b are perspective views of the example embodiment of an air nozzle device according to the present invention, while FIG. 1c is a cross-sectional view of the example embodiment of the air nozzle device in FIGS. 1a and 1b. In FIGS. 1a-1c, the air nozzle device is in an assembled configuration, while FIG. 1d shows an exploded view of the components of the example embodiment of the air nozzle device.

In this example embodiment, the air nozzle device 10 comprises a housing 11 defining an interior volume. The interior volume may have an inner surface extending in the direction X, Y and Z. Thus the housing here is defined by an inner surface. The inner surface is typically encircling at least a part of an air flow channel 18 extending through the housing 11. The housing in this example embodiment has an extension in the longitudinal (horizontal) direction X, an extension in the transverse direction Y and an extension in the vertical direction Z. The device is typically installed in a horizontal orientation in the vehicle. It should be readily appreciated that the directions are only provided for ease of understanding, and refers to the directions of the device and the housing when the device is installed in an essentially plane configuration in the vehicle. In other words, the directions may not be essentially horizontal and vertical in a configuration when the device (and the housing) is installed in an angled position. Alternatively, the device can be installed in an essentially vertical orientation in the vehicle. As such, the directions should be construed to refer to the directions of the device and the air flow when the device is in an essentially plane installation in a vehicle. The shape of the housing is in this example embodiment a three-dimensional shape having a rectangular cross-section. However, other shapes are conceivable such as a three-dimensional shape having a circular cross-section, i.e. a cylinder. It is even possible that the shape of the housing is provided in the form of a bowl.

In all example embodiments as shown in the Figures herein, the housing has an air inlet 12 at one side 64, an air discharge opening 14 at a second side 62 and an air flow channel 18 through the housing 11 for transporting a flow of air between the air inlet 12 and the air discharge opening 14. The air inlet is typically connected to an air duct (not shown), which is connected to e.g. an air ventilation system, air conditioning system, air heating system or the like. Thus, the air nozzle device can be considered as the interface between the air ventilation system (or the air conditioning system or the air heating system) and the vehicle compartment. Accordingly, the air inlet 12 is arranged upstream of the air discharge opening 14, as seen in a longitudinal direction X. In other words, the air discharge opening is arranged downstream of the air inlet 12, as seen in a longitudinal direction X.

The air inlet 12 is configured for receipt of air from an air duct (not shown). The air discharge opening 14 is configured for discharging air into the vehicle compartment. The air flow channel 18 is configured for transporting the flow or air through the housing 11.

As will be readily appreciated from the description herein, the air nozzle device is configured for distributing and directing a flow of air within the vehicle compartment. In addition, the air nozzle device is configured for regulating the level of air, as described below.

Moreover, the device 10 further comprises a moveable operating member 30, a shutoff mechanism 40 and an air flow adjustment arrangement 20. Further details of the moveable operating member 30 will be described in relation to FIG. 2.

In this example embodiment, as shown in FIGS. 1a to 1d, the shutoff mechanism 40 is configured to regulate the air flow. Typically, the shutoff mechanism is connected to the housing via the operating member 30. Alternatively, the shutoff mechanism may be pivotably connected to the housing 11.

The air flow adjustment arrangement 20 is pivotably connected to the housing 11 and configured to adjust the direction of the air flow in a transverse direction Y and in the vertical direction Z. Thus, in the example embodiment as shown in FIGS. 1a-1d, when the air flow adjustment arrangement comprises a vertical air flow adjustment mechanism 22 and a horizontal air flow adjustment mechanism 24, the vertical air flow adjustment mechanism 22 is separately pivotably connected to the housing 11 and configured to adjust the direction of the air flow in the vertical direction Z, while the horizontal air flow adjustment mechanism 24 is separately pivotably connected to the housing 11 and configured to adjust the direction of the air flow in a transverse direction Y.

It is to be noted that typically, although not strictly required, the air flow adjustment arrangement 20 in this example embodiment, as described in relation to the FIGS. 1a through 1d, FIG. 2 and FIGS. 3a through 3j, here comprises the vertical air flow adjustment mechanism 22 for adjusting the air flow in the vertical direction Z and the horizontal air flow adjustment mechanism 24 for adjusting the air flow in the transverse direction Y.

Moreover, as illustrated in FIGS. 1a and 1d, the operating member 30 comprises a user-actuated manual mechanism 32, a first linkage member 34 and a second linkage member 36.

Figure 2:
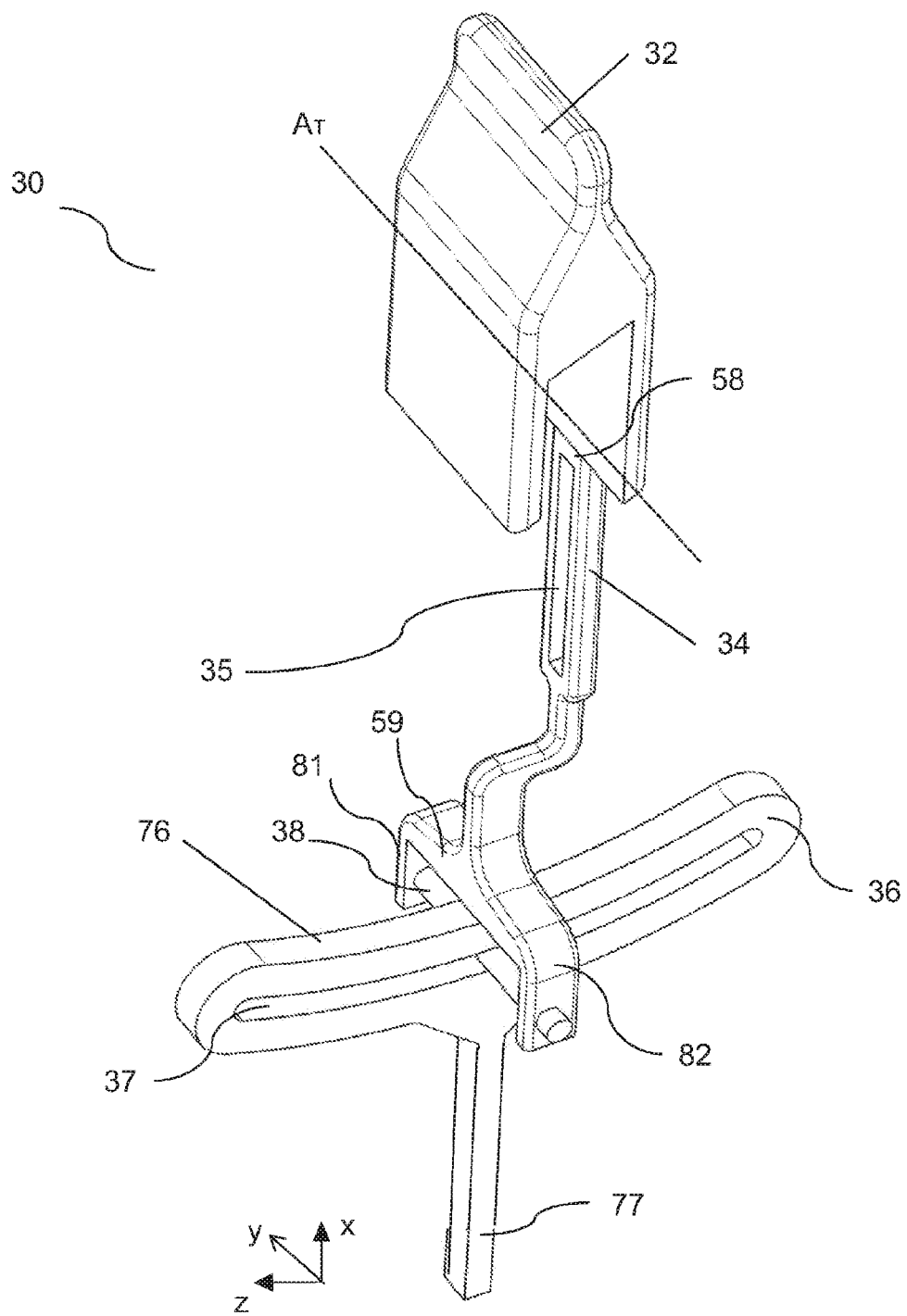
FIG. 2 schematically illustrates a more detailed view of a moveable operating member of an air nozzle device according to an example embodiment of the present invention.

The first linkage member 34 is connected to the user-actuated manual mechanism 32 at one end 58 and the second linkage member 36 at a second end 59, as is also shown in FIG. 2.

The first linkage member 34 comprises a channel or groove 35 to accommodate a part of a guiding pin 25 of the air flow adjustment arrangement 20. Further, the channel or groove 35 extends at least partly in the longitudinal direction X to permit a movement of the first linkage member 34, and thereby a movement of the second linkage member and the operating member, along the longitudinal direction X independently of the position of the air flow arrangement 20, while an adjustment of the air flow arrangement 20 is effected by a movement of the first linkage member 34 in the transverse direction Y independently of the position of the shutoff mechanism 40.

In the example embodiment, as shown in the Figures, i.e. when the air flow adjustment arrangement 20 comprises the vertical air flow adjustment mechanism 22 for adjusting the air flow in the vertical direction Z and the horizontal air flow adjustment mechanism 24 for adjusting the air flow in the transverse direction Y, the horizontal air flow mechanism 24 comprises the guiding pin 25. Further, in this example embodiment, the first linkage member 34 comprises the channel or groove 35 to accommodate a part of the guiding pin 25 of the horizontal air flow adjustment mechanism 24.

Thus, the channel or groove 35 extends at least partly in the longitudinal direction X to permit a movement of the first linkage member 34, and thereby a movement of the second linkage member and the operating member, along the longitudinal direction X independently of the position of the horizontal air flow adjustment mechanism 24, while an adjustment of the horizontal air flow adjustment mechanism 24 is effected by a movement of the first linkage member 34 in the transverse direction Y independently of the position of the shutoff mechanism 40. Accordingly, the first linkage member 34 is configured to cooperate with the second linkage member 36 to adjust the position of the shutoff mechanism 40 upon a movement of the first linkage member 34 in a longitudinal direction X and further configured to cooperate with the guiding pin 25 to adjust the horizontal air flow adjustment mechanism 24 upon a movement of the first linkage member 34 in the transverse direction Y.

To this end, the "term independently" typically refers to the principle that one component (e.g. the horizontal air flow adjustment), or several components, can be maintained in its position when another component (e.g. the shutoff mechanism) is adjusted via the operating member. In other words, the horizontal air flow adjustment mechanism 24 is maintained in its position, since the guiding pin 25 is freely movable in the longitudinal direction X of the recess 35, when the first linkage member 34 is moved in the longitudinal direction X. In other words, the position of the horizontal air flow adjustment mechanism 24 is unaffected by an adjustment of the shutoff mechanism 40 (by a movement of the first linkage member 34 and second linkage member 36).

Moreover, the first linkage member 34 comprises a linking pin 38 arranged at the second end, as shown in FIGS. 1*a* to 1*d* and FIG. 2. With particular reference to FIGS. 1*a* and 1*b*, the linking pin has a length in the transverse direction Y. Typically, the pin 38 has a rectangular cross-section or a circular cross-section.

Similar to the configuration of the first linkage member, the second linkage member 36 comprises a channel or groove 37 to accommodate a part of the linking pin 38 of the first linkage member. However, the channel or groove 37 (of the second linkage member 36) extends at least partly in the vertical direction Z to permit a movement of the first linkage member 34, and thereby the second linkage member and the operating member, along the vertical direction Z independently of the position of the shutoff mechanism 40, while a movement of the first linkage member 34 in the longitudinal direction X is translated into a movement of the second linkage member 36 to effect a regulation of the air flow by the shutoff mechanism 40 independently of the position of the air flow arrangement 20.

In the example embodiment, as shown in the Figures, i.e. when the air flow adjustment arrangement 20 comprises the vertical air flow adjustment mechanism 22 for adjusting the air flow in the vertical direction Z and the horizontal air flow adjustment mechanism 24 for adjusting the air flow in the transverse direction Y, the channel or groove 37 (of the second linkage member 36) extends at least partly in the vertical direction Z to permit a movement of the first linkage member 34 along the vertical direction Z independently of the position of the shutoff mechanism 40, while a movement of the first linkage member 34 in the longitudinal direction X is translated into a movement of the second linkage member 36 to effect a regulation of the air flow by the shutoff mechanism 40 independently of the position of the vertical air flow adjustment mechanism 22 and the position of the horizontal air flow adjustment mechanism 24.

In other words, the shutoff mechanism 40 is maintained in its position upon a movement of the first linkage member 34 in the vertical direction Z, since the linking pin 38 of the first linkage member 34 is freely movable in the vertical direction Z of the recess 37 of the second linkage member 36. The linking pin 38 of the first linkage member 34 is freely movable in the vertical direction Z of the recess 37 of the second linkage member 36 at least a distance corresponding to the length of the recess as seen in the vertical direction Z. In other words, the position of the shutoff mechanism 40 is unaffected by an adjustment of the vertical air flow adjustment mechanism 22 and the horizontal air flow adjustment mechanism 24, i.e. by an adjustment of the user-actuated manual mechanism 32 about a transverse axis and/or by an adjustment of the first linkage member along the transverse direction Y.

Since the linking pin 38 is configured to also move freely along the transverse direction due to the shape of the recess and that the linking pin has a length, as seen in the transverse direction Y, as shown in FIGS. 1*a* and 1*b*, and also in FIG. 2, it becomes possible only to move the first linkage member 34 along the transverse direction without adjusting the position of the shutoff mechanism 40. Accordingly, the configuration of the first linkage member 34 and the second linkage member 36 enables that the first linkage member 34 is freely movable along the transverse direction Y in relation to the second linkage member 36. Hence, the shutoff mechanism 40 and the second linkage member 36 are maintained in position upon a movement of the first linkage member 34 in the transverse direction Y.

Accordingly, the second linkage member 36 is configured to adjust the position of the shutoff mechanism 40 upon a movement of the second linkage member 36 in the longitudinal direction X. The second linkage member 36 is also configured to remain in position upon a movement of the first linkage member 34 in the transverse direction Y and/or in the vertical direction Z.

Moreover, in this example embodiment, as is shown in FIGS. 1*a* and 1*d*, the user-actuated manual mechanism 32 is arranged downstream of the air flow adjustment arrangement 20 to permit manual operation of the air flow adjustment arrangement 20 and the shutoff mechanism 40 from the outside of the device. In this context, the outside of the device here refers to the outside of the second side 62, as seen in the longitudinal direction X. In the configuration when the air flow adjustment arrangement 20 here comprises the vertical air flow adjustment mechanism 22 for adjusting the air flow in the vertical direction Z and the horizontal air flow adjustment mechanism 24 for adjusting the air flow in the transverse direction Y, the user-actuated manual mechanism 32 is arranged downstream of the vertical air flow adjustment mechanism 22 (and the horizontal air flow adjustment mechanism 24) to permit manual operation of the vertical air flow adjustment mechanism 22, the horizontal air flow adjustment mechanism 24 and the shutoff mechanism 40 from the outside of the device.

In this context, the outside of the device here refers to the outside of the second side 62, as seen in the longitudinal direction X.

As mentioned above, downstream here refers to a position along the horizontal direction x (longitudinal direction) of the device. Typically, the air flow adjustment arrangement is arranged downstream of the shutoff mechanism 40.

By this configuration of the example embodiment, the first linkage member 34 is movably arranged to the second linkage member 36 such that a movement of the shutoff mechanism 40 is effected by a movement of the operating member 30 in a longitudinal direction X and an adjustment of the air flow adjustment arrangement 20 is effected by a movement of the operating member 30 in a transverse and/or vertical direction depending on transverse or vertical air flow adjustment. More specifically, a transverse adjustment of the air flow via adjustment of the horizontal air flow adjustment mechanism 24 is effected by a movement of the operating member 30 in a transverse direction Y. Thus, a vertical adjustment of the air flow via the vertical air flow adjustment mechanism 22 is effected by a movement of the operating member 30 in a vertical direction Z. In addition, as described herein, any one of the vertical air flow adjustment mechanism 22 and the horizontal air flow adjustment mechanism 24 (i.e. the air flow adjustment arrangement 20) and the shutoff mechanism 40 can be independently operated within the device. To this end, the device provides a multi-functional solution which is both compact and robust while allowing for an integrated push/pull function via the operating member that is operable from the outside of the device as seen in the longitudinal direction X, as shown in FIGS. 1a and 1d.

The user-actuated manual mechanism 32 may be slidably engaged to the air flow arrangement 20 and movable along the longitudinal direction X and the transverse direction Y upon operation of a user. In this example embodiment, as described in relation to FIGS. 1a-1d, the user-actuated manual mechanism 32 is slidably engaged to the vertical air flow adjustment mechanism 22 and movable along the longitudinal direction X and the transverse direction Y of the mechanism 22 upon operation of a user. Thus, the operating member 30 is configured to be movable along the longitudinal direction X, while the first linkage member 34 of the operating member 30 is configured to be movable along the longitudinal direction X, the transverse direction Y and the vertical direction Z.

As an example, the user-actuated manual mechanism 32 can be slidably arranged on a flange 92 of the vertical air flow adjustment mechanism 22. A slidably arrangement between two components can be provided in several different ways, e.g. by means of two frictional surfaces. However, this type of arrangement is well-known in the art, and is therefore not further described herein.

Typically, the user-actuated manual mechanism 32 is slidably engaged to the vertical air flow adjustment mechanism 22 and configured to permit operation of the user-actuated manual mechanism 32 along the longitudinal direction X and the transverse direction Y, upon operation of a user, independently of the position of the vertical air flow adjustment mechanism 22, while an adjustment of the vertical air adjustment mechanism 22 is effected by a movement of the manual mechanism 32 in the vertical direction Z. In this example embodiment, a movement of the user-actuated manual mechanism 32 in the vertical direction Z corresponds to an inclination of the mechanism 32 about a transverse axis $A_T$, as shown in FIG. 2.

Thus, the user-actuated manual mechanism 32 is typically connected to the first linkage member 32 to permit a pivoting of the user-actuated manual mechanism 32 about the transverse axis $A_T$.

Typically, although not strictly required, the first linkage member 34 is here arranged through a passage of the air flow arrangement 20 and connected to the second linkage member 36 upstream from the air flow arrangement 20. In this example embodiment, the first linkage member 34 is here arranged through a passage of the vertical air flow adjustment mechanism 22 and connected to the second linkage member 36 of the horizontal air flow adjustment 24. The passage may as an example be located essential in a central region in the device, as seen in the directions X, Y, and Z.

In a configuration as shown in the Figures, e.g. in FIGS. 1a and 1d, when the air flow adjustment arrangement 20 comprises the vertical air flow adjustment mechanism 22 and the horizontal air flow adjustment mechanism 24, the vertical air flow adjustment mechanism 22 is independently pivotably connected to the housing 11 via at least one pivoting connection 68a and 68b. The pivoting connection is configured to permit the vertical air flow adjustment mechanism 22 to pivot about a transverse pivot axis $A_{TP}$. Typically, the pivoting connection includes a set of pivoting points at opposite vertical sides of the mechanism 22, as shown in FIGS. 1a and 1d. Although strictly not necessary, the vertical air flow adjustment mechanism 22 is here independently pivotably connected to the housing 11 via a plurality of pivoting connections 67a and 67b, 68a, 68b, 69a and 69b. As an example, the pivoting connections may include a set of three pivoting connections arranged spaced apart, a shown in e.g. FIGS. 1a and 1d. In addition, the pivoting points of the pivoting connections are arranged on opposite vertical sides of the mechanism 22.

Referring again to FIGS. 1a and 1d, the vertical air flow adjustment mechanism 22 in this example embodiment comprises a set of spaced apart air directing elements in the form of blades or flanges 92 pivotably arranged about the pivoting connections 67, 68 and 69. The set of the spaced apart air directing elements (in the form of blades or flanges) 92 may be pivotably arranged about one single pivoting connection in the form of one module. Alternatively, as shown in FIGS. 1a and 1d, the set of spaced apart air directing elements, in the form of blades or flanges 92, can be arranged individually about a number of spaced apart pivoting connections 67, 68 and 69. The air directing elements 92 may in general each have a rectangular cross-section and a length extending in the transverse direction y. To this end, the air directing elements 92 are configured to direct the air flow in the vertical direction Z.

Typically, each flange of the set of flanges 92 is configured to be adjusted between a plurality of positions by being rotationally arranged about a vertical axis, respectively. In this way, the vertical air flow adjustment mechanism 22 is adjusted between a plurality of positions, as seen in the vertical direction Z. Typically, the vertical air flow adjustment mechanism 22 is at least moveable between an outer first position 150 and an outer second (upper) position 160, as seen in the vertical direction Z. In an example, when the mechanism is adjusted along the vertical direction Z, the outer first position may refer to the lower position, while the outer second position may refer to the upper position.

Analogously, in a configuration as shown in the Figures, e.g. in FIGS. 1a and 1d, when the air flow adjustment arrangement 20 comprises the vertical air flow adjustment mechanism 22 and the horizontal air flow adjustment mechanism 24, the horizontal air flow adjustment mechanism 24 is independently pivotably connected to the housing 11 via at least one pivoting connection 88a and 88b. The pivoting connection of the horizontal air flow adjustment mechanism 24 is configured to permit the horizontal air flow adjustment mechanism 24 to pivot about a vertical pivot axis. Typically, the pivoting connection of the horizontal air flow adjustment mechanism 24 includes a set of pivoting points at opposite horizontal sides of the mechanism 24, as shown in FIGS. 1a and 1d. Although strictly not necessary, the horizontal air flow adjustment mechanism 24 is here independently pivotably connected to the housing 11 via a plurality of pivoting connections 87a and 87b, 88a, 88b, 89a and 89b. As an example, the pivoting connections may include a set of three pivoting connections arranged spaced apart, as shown in e.g. FIGS. 1a and 1d. In addition, the pivoting points of the pivoting connections are arranged on opposite horizontal sides of the mechanism 24.

Referring again to FIGS. 1a and 1d, the horizontal air flow adjustment mechanism 24 in this example embodiment here comprises a set of spaced apart air directing elements in the form of blades or flanges 94 pivotably arranged about the pivoting connections 87, 88, and 89. The set of the spaced apart air directing elements (in the form of blades or flanges) 94 may be pivotably arranged about one single pivoting connection in the form of one module, or, as shown in FIGS. 1a and 1d, individually about the several spaced apart pivoting connections 87, 88 and 89. The air directing elements 94 may in general each have a rectangular cross-section and a length extending in the vertical direction Z. To this end, the air directing elements 94 are configured to direct the air flow in the transverse direction Y.

Typically, each flange of the set of flanges 94 is configured to be adjusted between a plurality of positions by being rotationally arranged about a transverse axis, respectively. In this way, the horizontal air flow adjustment mechanism 24 is adjusted between a plurality of positions, as seen in the transverse direction Y. Typically, the horizontal air flow adjustment mechanism 24 is at least moveable between an outer first transverse position 130 and an outer second transverse position 140, as seen in the transverse direction Y. In an example, when the mechanism 24 is adjusted along the transverse direction Y, the outer first transverse position may refer to the right position, while the outer second transverse position may refer to the left position.

As may be gleaned from FIGS. 1a and 1d, the guiding pin 25 of the air flow adjustment arrangement is here arranged on the horizontal air flow adjustment mechanism 24. The guiding pin may as an example be provided in the form of a thin member having a rectangular cross-section and a length in the vertical direction z, when seen in an assembled configuration of the device. The pin 25 can be an integral part of the horizontal air flow adjustment mechanism 24 or provided in the form of a separate part connected to the horizontal air flow adjustment mechanism 24 in a vertical orientation, as shown in FIGS. 1a and 1d, the cross-section of the pin may alternatively be circular. The guiding pin 25 is configured to cooperate with the recess 35 of the first linkage member 32 so as to effect a movement of the horizontal air flow adjustment arrangement 24 by a movement of the first linkage member 32 in a transverse direction Y, while maintaining the position of the horizontal air flow adjustment arrangement 24 upon a movement of the first linkage member 32 along the longitudinal direction X. This is due to that the guiding pin 5 is freely movable in the recess along the direction X.

Optionally, although strictly not required, the shutoff mechanism 40 may further be connected to the housing 11 via the operating member 30. One example advantage with this configuration is that the operating member 30 and the shutoff mechanism 40 is arranged to the housing in a more secure and stable manner.

The shutoff mechanism 40 is in this example embodiment configured to move between an open position defining a passage for the air flow in the air flow channel and a closed position defining an essentially air tight configuration against (with) the inner surfaces of the housing 11, as shown in the FIGS. 3a-3j. However, it should be readily appreciated that the shutoff mechanism can be varied and moved to a position between the open position and the closed position. Thus, the shutoff mechanism can be moved and maintained in a position between the open position and the closed position. As an example, the shutoff mechanism can be moved so that the air flow passage is essentially 50% open etc.

As an example, and as shown in FIGS. 1a to 1d and FIG. 4, the shutoff mechanism 40 thus typically, although not strictly necessary, comprises a pair of blades being moveable between the open position in which the set of blades forms a passage for the air flow in the air flow channel and the closed position in which the set of blades are adapted to form an essentially air tight configuration against the inner surfaces of the housing.

Thereby, the user-actuated manual mechanism 32 of the operating member 30 is capable of open/close the shutoff mechanism 40 via a movement of the first linkage member 34 and the second linkage member 36 along the longitudinal direction X.

In addition, the user-actuated manual mechanism 32 of the operating member 30 is capable of independently adjusting the direction of the air flow via the air flow adjustment arrangement 20, while maintaining the position of the shutoff mechanism 40, by a movement of the first linkage member 32 along the transverse direction Y. In the example embodiment as illustrated in FIGS. 1a to 1d, FIG. 2, FIGS. 3a to 3j, and FIG. 4, the user-actuated manual mechanism 32 of the operating member 30 is capable of independently adjusting the transverse direction of the air flow via the horizontal air flow adjustment mechanism and the vertical direction of the air flow via the vertical air flow adjustment mechanism, while maintaining the position of the shutoff mechanism 40, by a movement of the first linkage member 32 along the transverse direction Y.

As is readily appreciated from the explanations above in conjunction with the FIGS. 3a through 3j, as described hereinafter, there is herein disclosed an example embodiment of an air nozzle device that, when the air flow adjustment arrangement comprises the vertical air flow adjustment mechanism 22 and the horizontal air flow adjustment mechanism 24, the user-actuated manual mechanism 32 of the operating member 30 is capable of independently adjusting the vertical air flow adjustment mechanism 22 by a movement of the first linkage member 32 along the vertical direction Z, independently adjusting the horizontal air flow adjustment mechanism 24 by a movement of the first linkage member 32 along the transverse direction Y, and independently regulating the air flow via the shutoff mechanism 40 by a movement of the operating member 30 along the longitudinal direction X.

FIG. 2 schematically illustrates a more detailed view of the moveable operating member 30 of the air nozzle device according to an example embodiment of the present invention. As mentioned above, the operating member 30 comprises a user-actuated manual mechanism 32, a first linkage member 34 and a second linkage member 36. Typically, the user-actuated manual mechanism 32 is adapted to be manipulated by a user to move the operating member 30 in order to regulate (via the shutoff mechanism) and/or redirect the air flow (via the horizontal and/or the vertical air flow adjustment mechanisms) according to the user's wishes. As is shown in FIG. 2, the first linkage member 34 is connected to the user-actuated manual mechanism 32 at one end 58 and the second linkage member 36 at a second end 59. The end 58 is here arranged downstream from the second 59, as seen in the longitudinal direction x. In addition, the operating member 30 has an extension in the direction x, the transverse direction y and the vertical direction z. Furthermore, the first linkage member 34 comprises the channel or groove 35 to accommodate a part of the guiding pin 25 of the horizontal air flow adjustment mechanism 24 (as shown in e.g. FIG. 1a). The channel or groove 35 extends at least partly in the longitudinal direction X to permit a movement of the first linkage member 34 along the longitudinal direction X, as mentioned above.

Referring now to FIGS. 1a to 1d, in particular FIG. 1c, in conjunction to FIG. 2, the first linkage member is configured to be freely movable along the vertical direction Z of the first linkage member, thereby freely movable in the vertical direction Z of the device 10, at least along the length of the guiding pin 25 in the vertical direction Z. In this manner, the first linkage member 34 can be moved in the vertical direction Z without moving the shutoff mechanism 40 and the horizontal air flow adjustment mechanism 24, at least between a movement corresponding to the length of the guiding pin 25 in the vertical direction. In other words, the position of the shutoff mechanism 40 is unaffected by an adjustment of the vertical air flow adjustment mechanism 22 upon a movement of the user-actuated manual mechanism 32 in the vertical direction Z, e.g. by pivoting the user-actuated manual mechanism 32 about a transverse axis $A_T$. Analogously, the position of the horizontal air flow adjustment mechanism 24 is unaffected by an adjustment of the vertical air flow adjustment mechanism 22 upon a movement of the user-actuated manual mechanism 32 in the vertical direction Z, e.g. by pivoting the user-actuated manual mechanism 32 about the transverse axis $A_T$.

Since the guiding pin 25 is configured to also move freely along the longitudinal direction X due to the shape of the recess, as seen in the longitudinal direction X, it becomes possible only to move the first linkage member 34 along the longitudinal direction X, at least a distance corresponding to the length of the recess in the longitudinal direction X, without adjusting the position of the horizontal air flow adjustment mechanism 24. Accordingly, the configuration of the first linkage member 34 and the guiding pin 25 enables that the horizontal air flow adjustment mechanism 24 is only adjusted based on a movement of the first linkage member 34 along the transverse direction Y, while the shutoff mechanism 40 and the second linkage member 36 are maintained in position upon a movement of the first linkage member 34 in the transverse direction Y.

Moreover, the first linkage member 34 comprises the linking pin 38 arranged at the second end 59. Typically, as shown in FIG. 2, the linking pin 38 extends between two additional members 81, 82, which are arranged in a fork-like configuration. Thus the linking pin is oriented essentially in the transverse direction and arranged in-between the two members 81, 82. However, it is to be noted that other arrangements of the linking pin 38 are possible as long as the function of the first linkage member and the second linkage member is not compromised. The linking pin 38 can either be an integral part of the first linkage member or a separate part connected to the first linkage member.

Similar to the configuration of the first linkage member, the second linkage member 36 comprises a channel or groove 37 to accommodate a part of the linking pin 38 of the first linkage member. However, the channel or groove 37 of the second linkage member 36 extends at least partly in the vertical direction Z to permit a movement of the first linkage member 34, along the vertical direction Z independently of the position of the shutoff mechanism 40, while a movement of the first linkage member 34 in the longitudinal direction X is translated into a movement of the second linkage member 36 to effect a regulation of the air flow by the shutoff mechanism 40 independently of the position of the air flow arrangement 20.

In other words, the shutoff mechanism 40 is maintained in its position, since the linking pin 38 is freely movable in the vertical direction Z of the recess 37 of the second linkage member. Accordingly, the position of the shutoff mechanism 40 is unaffected by an adjustment of the vertical air flow adjustment mechanism 22 and the horizontal air flow adjustment mechanism 24, i.e. by an adjustment of the user-actuated manual mechanism 32 about a transverse axis and/or by an adjustment of the first linkage member along the transverse direction Y.

Since the linking pin 38 is configured to also move freely along the transverse direction y due to the shape of the recess 37 and that the linking pin 38 has a length, as seen in the transverse direction Y, it becomes possible only to move the first linkage member 34 along the transverse direction Y without adjusting the position of the shutoff mechanism 40. Accordingly, the configuration of the first linkage member 34 and the second linkage member 36 enables that the first linkage member 34 is freely movable along the transverse direction Y in relation to the second linkage member 36. Hence, the shutoff mechanism 40 and the second linkage member 36 are maintained in position upon a movement of the first linkage member 34 in the transverse direction Y.

As shown in FIGS. 1a through 1d, and in FIG. 2, the first linkage member 34 and the second linkage member 36 are essentially oriented in a central region of the device 10. Thus the operating member 30 is essential oriented in the central region of the device 10.

Figure 4:
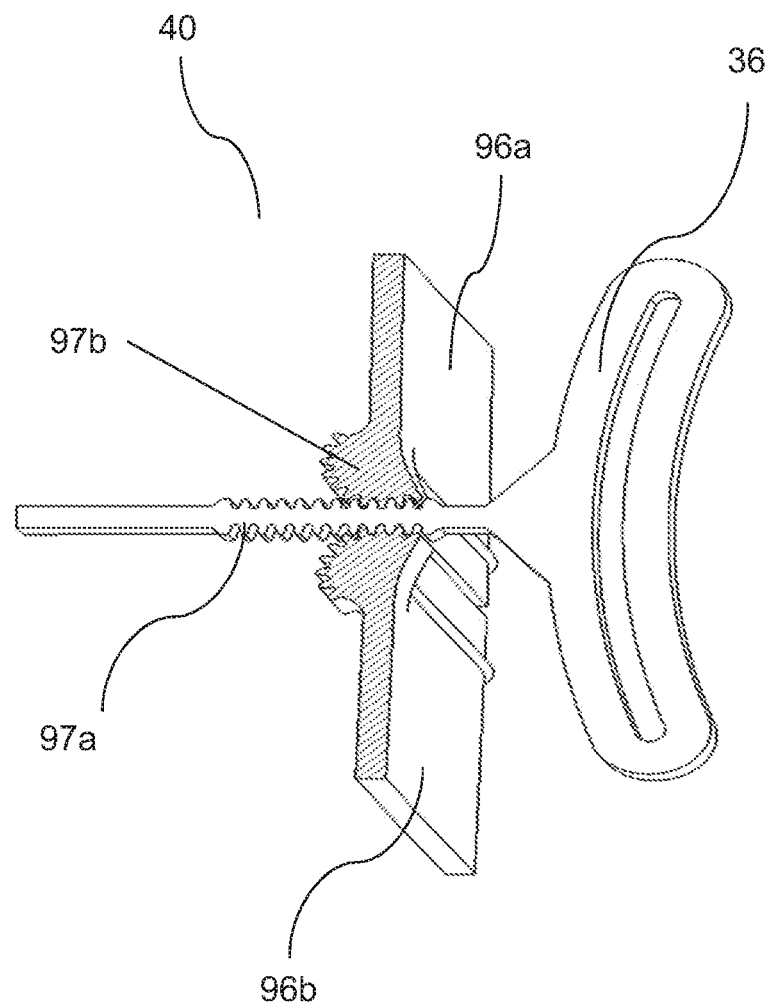
FIG. 4 schematically illustrates a more detailed view of a shutoff mechanism of an air nozzle device according to an example embodiment of the present invention.

Typically, although not strictly required, the second linkage member 36 is connected to the shutoff mechanism 40 via a gearwheel connection for effecting a rotational movement of the set of blades 96a and 96b upon a movement of the second linkage member 36 along the longitudinal direction X. One example embodiment of a shutoff mechanism 40 provided with this type of gearwheel arrangement 97 is shown in FIG. 4. As is illustrated, the second linkage member 36 is here provided with serrations 97a (or teeth) configured to cooperate with a gearwheel 97b on the shutoff mechanism. Thereby, the shutoff mechanism is adjusted in position upon a movement of the second linkage member 36 via a translation of motion between the serrations 97a of the second linkage member and the gearwheel 97b. This type of gearwheel connection is well-known in the art, and therefore not further described herein.

Although not shown, the second linkage member 36 may further comprise an activation mechanism for connecting the second linkage member 36 to the housing 11 to provide a fixation of the operating member 30 to the housing 11.

As shown in FIG. 2, the second linkage member 36 is here a T-shaped member having a first horizontal section 77 essentially extending in the longitudinal direction X and a vertical member 76 essentially extending in the vertical direction Z. In this type of configuration of the second linkage member, the vertical member 77 is provided with the channel or groove 37.

From the above description, it is to be noted that the operating member 30 is configured to move in the longitudinal direction X upon manipulation of the operating member 30 via the user-actuated manual mechanism 32 along the longitudinal direction X. In addition, the first linkage member 34 is configured to move in the transverse direction Y independently of the second linkage member 36 upon manipulation of the user-actuated manual mechanism 32 along the transverse direction Y and in the vertical direction Z independently of the second linkage member 36 upon manipulation of the user-actuated manual mechanism 32 along the vertical direction Z.

As such, the user-actuated manual mechanism 32 of the operating member 30 is capable of independently controlling any one of the shutoff mechanism 40, the vertical air flow adjustment mechanism 22 and the horizontal air flow adjustment mechanism 24 to set the air nozzle device in a desired configuration so as to allow a user to regulate and direct the air flow depending on the user's wishes.

To this end, the operating member 30 is typically capable of positioning the shutoff mechanism 40 in two positions, i.e. the open position and the closed position. When the shutoff mechanism 40 is in an open position, the set of blades 96a and 96b are arranged parallel to the longitudinal direction X. Accordingly, when the shutoff mechanism 40 is in the closed position, the set of blades 96a and 96b are arranged perpendicular to the longitudinal direction X.

Thus, the shutoff mechanism is provided in the form of a push-pull mechanism 40.

As mentioned above, the user-actuated manual mechanism 32 of the operating member 30 is capable of independently controlling any one of the shutoff mechanism 40, the vertical air flow adjustment mechanism 22 and the horizontal air flow adjustment mechanism 24 to set the air nozzle device in a desired configuration so as to allow a user to regulate and direct the air flow depending on the user's wishes.

In order to facilitate the understanding of the principle behind the example embodiments of the invention, a set of positions of the device will now be described with reference to FIGS. 3a-3j. In these figures, the example embodiment as described in relation to FIGS. 1a through 1b, 2 and 4 is shown in a configuration when the air flow adjustment arrangement comprises the vertical air flow adjustment mechanism 22 and the horizontal air flow adjustment mechanism 24. Throughout the description of the FIGS. 3a-3j, each Figure illustrates an operational state of the air nozzle device, in which the positions of the shutoff mechanism, the vertical air flow adjustment mechanism and the horizontal air flow adjustment mechanism are shown in relation to each other. The positions of the mechanisms are varied based on the movements of the operating member 30, as mentioned above.

Figure 3A:
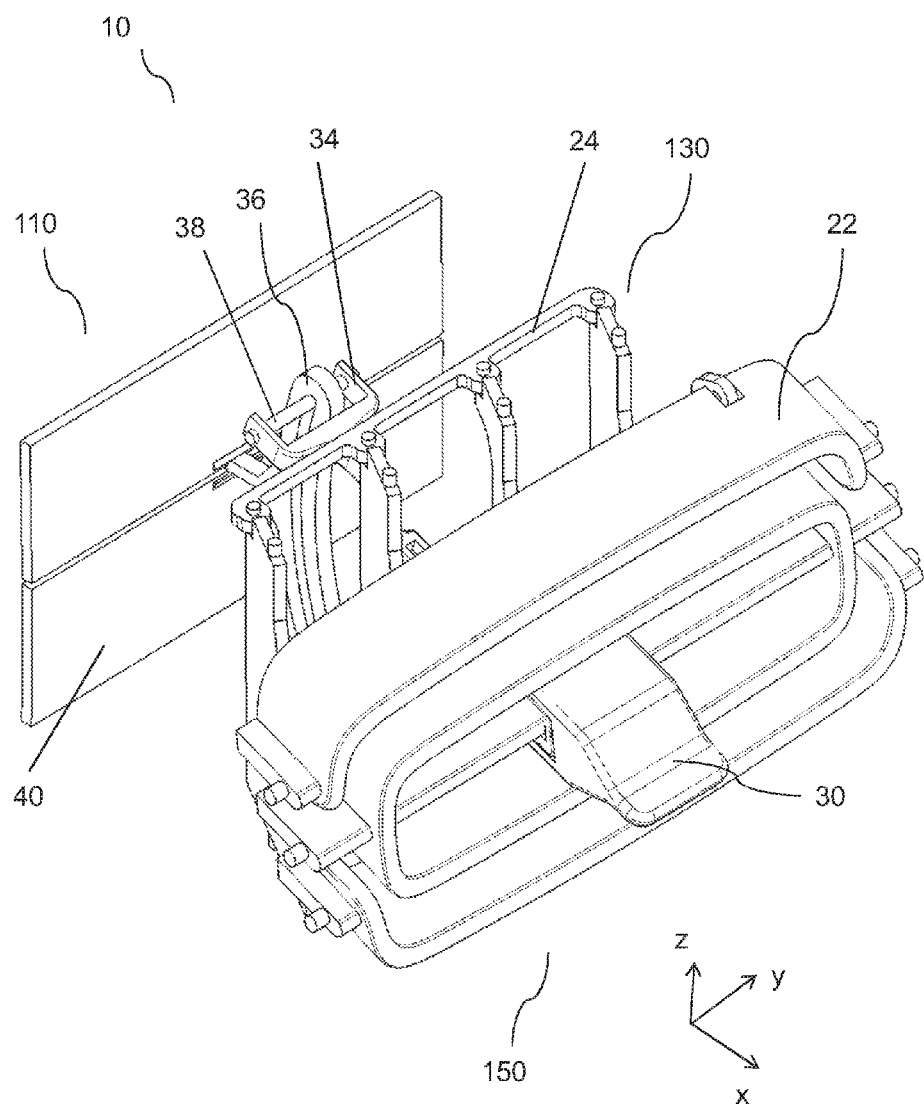
FIG. 3a illustrates the first example embodiment of the air nozzle device in an operational state, in which a shutoff mechanism for regulating the air flow is in a closed position, a vertical air flow adjustment mechanism for adjusting the air flow in the vertical direction Z is in an outer first (lower) position and a horizontal air flow adjustment mechanism for adjusting the air flow in the transverse direction Y is in an outer first transverse (right) position.

FIG. 3a illustrates an exemplary embodiment of the air nozzle device in an operational state, in which the shutoff mechanism 40 for regulating the air flow is in the closed position 110, as defined above. In addition, the vertical air flow adjustment mechanism 22 for adjusting the air flow in the vertical direction Z is here in the outer first (lower) position 150 and the horizontal air flow adjustment mechanism 24 for adjusting the air flow in the transverse direction Y is in the outer first transverse (right) position 130.

The operating member 30 is here pushed against the vertical air flow adjustment mechanism 22 as seen in the longitudinal direction x so that the shutoff mechanism 40 is set in the closed position, i.e. the set of flanges 96a and 96b forms an air-tight configuration with the inner surface of the housing (although not shown in FIG. 3a).

Further, the first linkage member 34 is positioned in an upper vertical location corresponding to an upper end region of the groove 37, as shown in FIG. 3a.

Figure 3B:
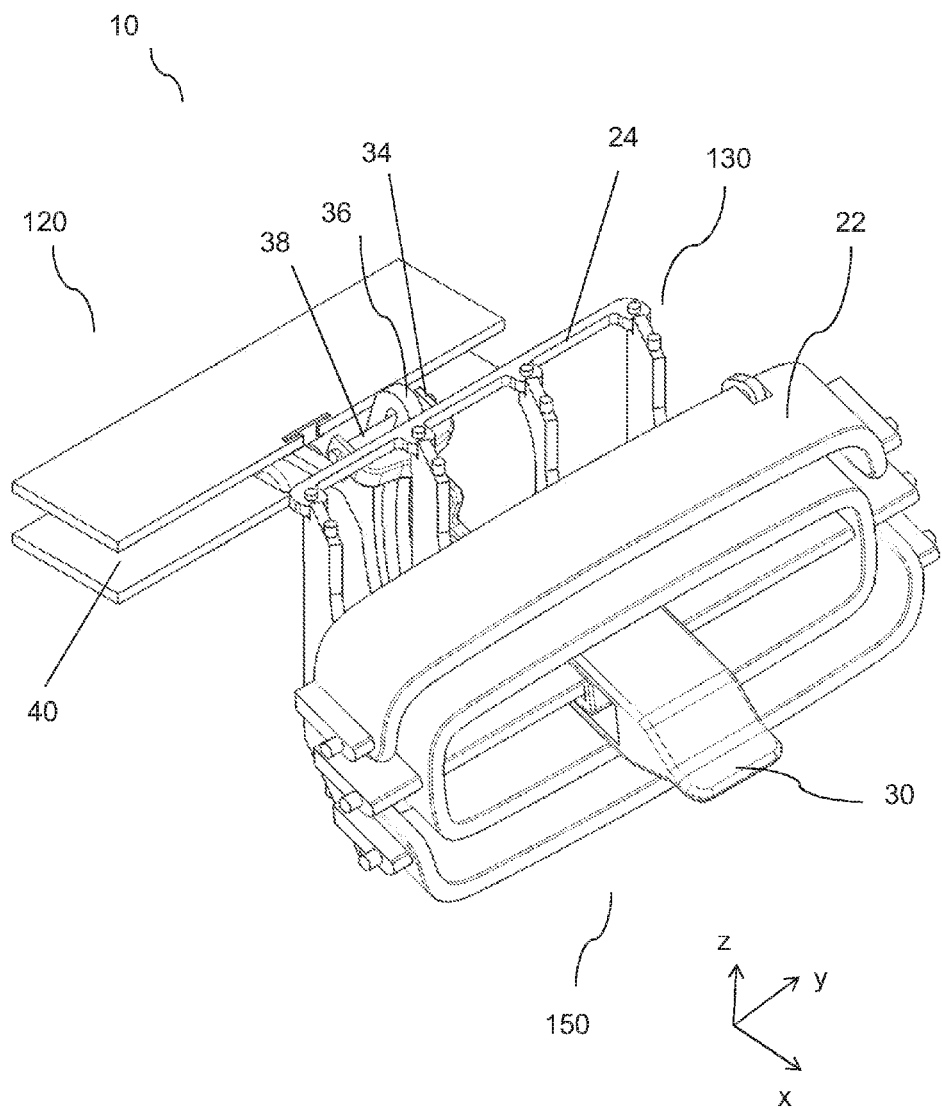
FIG. 3b illustrates the first example embodiment of the air nozzle device in an operational state, in which the shutoff mechanism for regulating the air flow is in an open position, the vertical air flow adjustment mechanism for adjusting the air flow in the vertical direction Z is in the outer first (lower) position and the horizontal air flow adjustment mechanism for adjusting the air flow in the transverse direction Y is in the outer first transverse (right) position.

FIG. 3b illustrates the first example embodiment of the air nozzle device in an operational state, in which the shutoff mechanism 40 for regulating the air flow is in the open position 120, the vertical air flow adjustment mechanism 22 for adjusting the air flow in the vertical direction Z is in the outer first (lower) position 150 and the horizontal air flow adjustment mechanism 24 for adjusting the air flow in the transverse direction Y is in the outer first transverse (right) position 130.

In other words, the operational state as described in relation to FIG. 3a only differs from the operational state as described in relation to FIG. 3b in that the shutoff mechanism 40 is adjusted from the closed position, as shown in FIG. 3a, to the open position, as shown FIG. 3b, while the position of the mechanism 22 and the position of the mechanism 24 are maintained, i.e. the position of the mechanism 22 and the position of the mechanism 24 are unaffected by the regulation of the air flow (an adjustment of the shutoff mechanism 40). In other words, the operating member 30 has been moved along the longitudinal direction X from a first position to a second position along the longitudinal direction X. Accordingly, by the configurations of the shutoff mechanism 40, the mechanism 22, the mechanism 24 and operating member 30 as described above in relation to FIGS. 1a-1d and FIG. 2, it becomes possible to regulate the air flow via the shutoff mechanism 40 independently of the position of the vertical air flow adjustment mechanism 22 and the horizontal air flow adjustment mechanism 24.

Figure 3C:
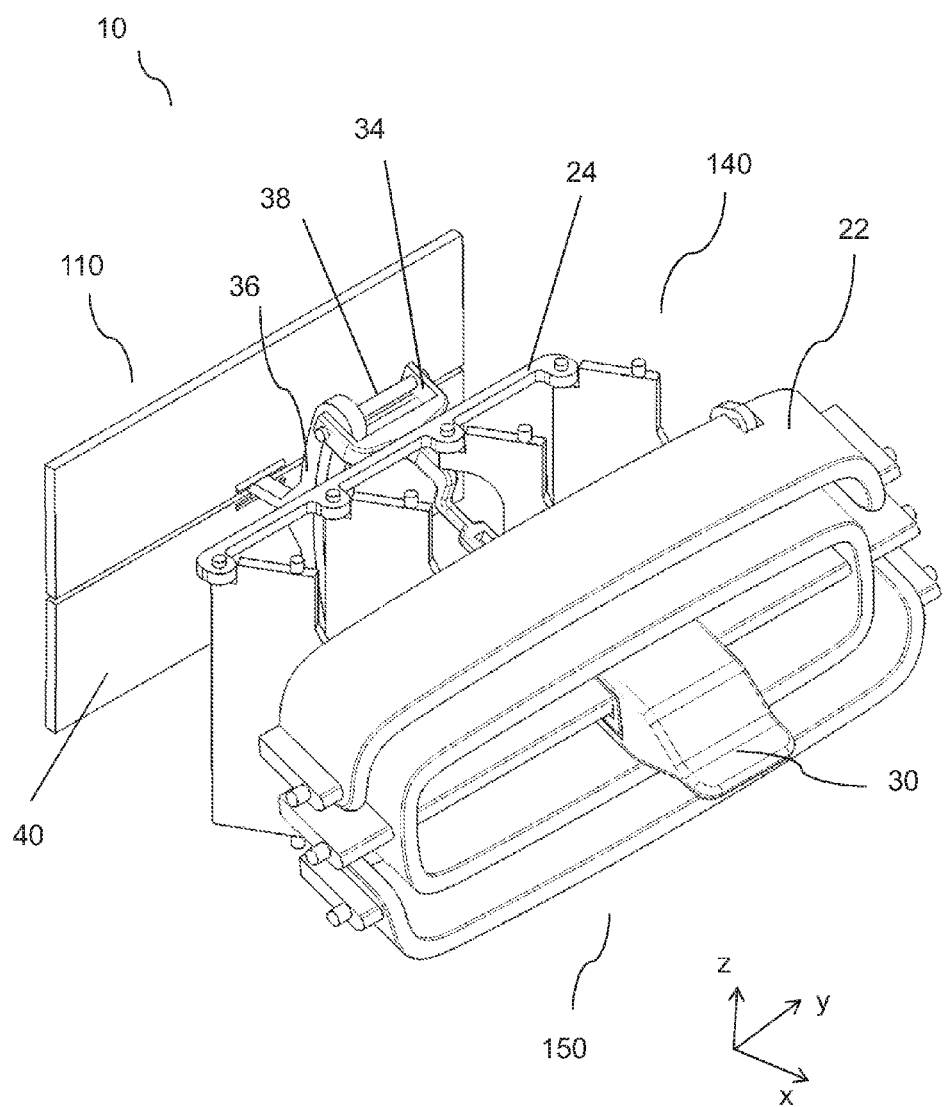
FIG. 3c illustrates the first example embodiment of the air nozzle device in an operational state, in which the shutoff mechanism for regulating the air flow is in the closed position, the vertical air flow adjustment mechanism for adjusting the air flow in the vertical direction Z is in the outer first (lower) position and the horizontal air flow adjustment mechanism for adjusting the air flow in the transverse direction Y is in an outer second transverse (left) position.

FIG. 3c illustrates the first example embodiment of the air nozzle device in an operational state, in which the shutoff mechanism 40 for regulating the air flow is in the closed position 110, the vertical air flow adjustment mechanism 22 for adjusting the air flow in the vertical direction Z is in the outer first (lower) position 150 and the horizontal air flow adjustment mechanism for adjusting the air flow in the transverse direction Y is in the outer second transverse (left) position 140.

Figure 3D:
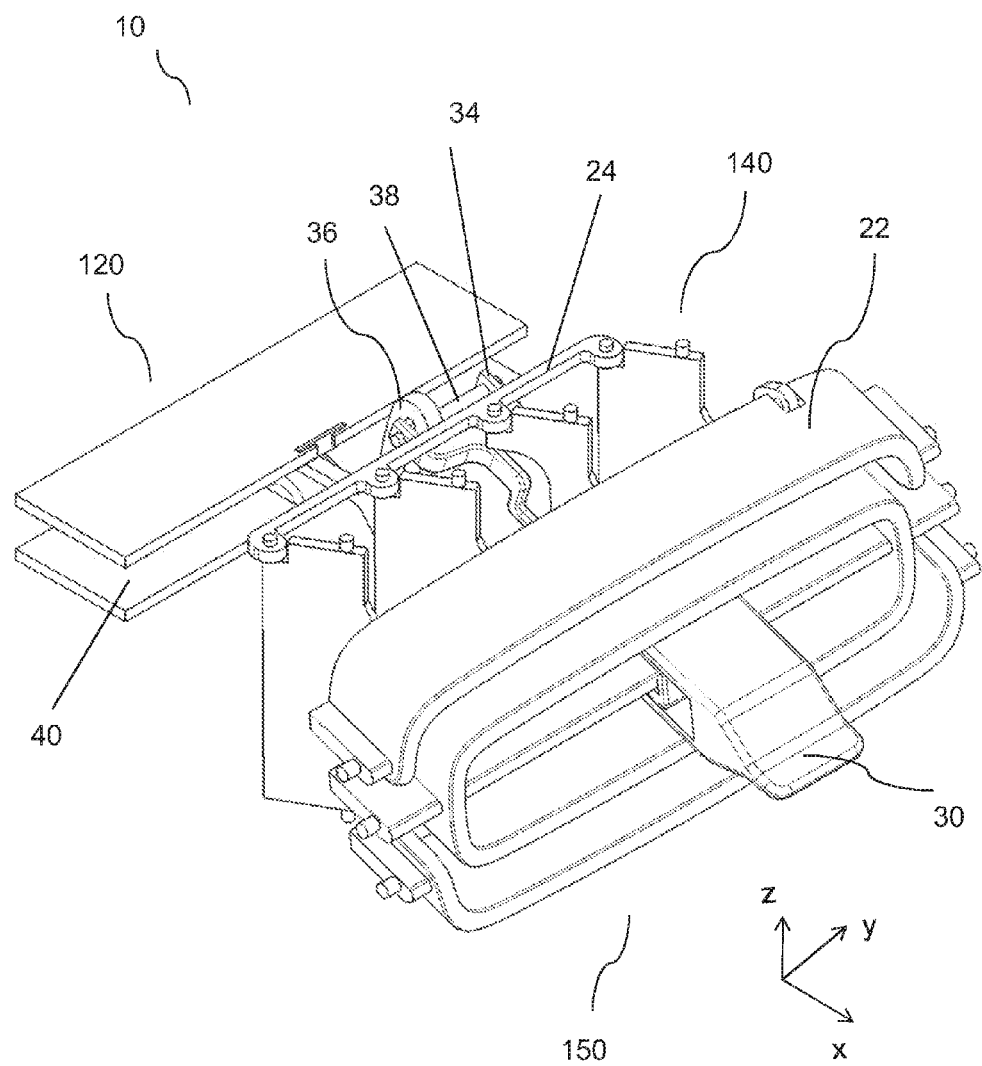
FIG. 3d illustrates the first example embodiment of the air nozzle device in an operational state, in which the shutoff mechanism for regulating the air flow is in the open position, the vertical air flow adjustment mechanism for adjusting the air flow in the vertical direction Z is in the outer first (lower) position and the horizontal air flow adjustment mechanism for adjusting the air flow in the transverse direction Y is in the outer second transverse (left) position.

Moreover, FIG. 3d illustrates the first example embodiment of the air nozzle device in an operational state, in which a shutoff mechanism 40 for regulating the air flow is in the open position 120, the vertical air flow adjustment mechanism 22 for adjusting the air flow in the vertical direction Z is in an outer first (lower) position 150 and the horizontal air flow adjustment mechanism 24 for adjusting the air flow in the transverse direction Y is in the outer second transverse (left) position 140.

In other words, the operational state as described in relation to FIG. 3c only differs from the operational state as described in relation to FIG. 3d in that the shutoff mechanism 40 is adjusted from the closed position, as shown in FIG. 3c, to the open position, as shown FIG. 3d, while the position of the mechanism 22 and the position of the mechanism 24 are maintained, i.e. the position of the mechanism 22 and the position of the mechanism 24 are unaffected by the regulation of the air flow (an adjustment of the shutoff mechanism 40) also when the horizontal air flow adjustment mechanism 24 is in the outer second transverse (left) position 140. As such, the operating member 30 has been moved along the longitudinal direction X from a first position to a second position along the longitudinal direction X without affecting the positions of the mechanisms 22 and 24. Accordingly, by the configurations of the shutoff mechanism 40, the mechanism 22, the mechanism 24 and operating member 30 as described above in relation to FIGS. 1a-1d and FIG. 2, it becomes possible to regulate the air flow via the shutoff mechanism 40 independently of the position of the vertical air flow adjustment mechanism 22 and the horizontal air flow adjustment mechanism 24.

Figure 3E:
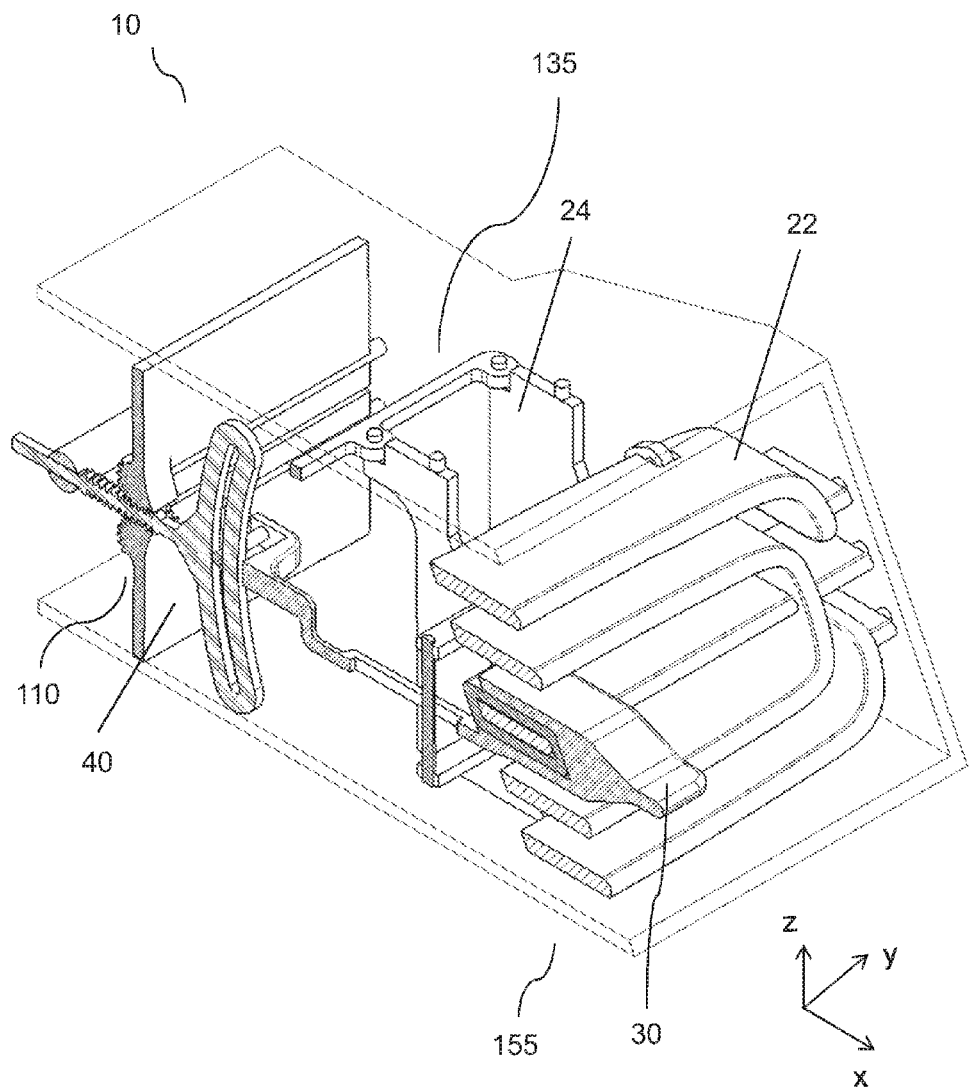
FIG. 3e is a cross-sectional view of the first example embodiment of the air nozzle device in an operational state, in which the shutoff mechanism for regulating the air flow is in the closed position, the vertical air flow adjustment mechanism for adjusting the air flow in the vertical direction Z is in a nominal position and the horizontal air flow adjustment mechanism for adjusting the air flow in the transverse direction Y is in a nominal position.

FIG. 3e is a cross-sectional view of the first example embodiment of the air nozzle device in an operational state, in which a shutoff mechanism 40 for regulating the air flow is in the closed position 110, the vertical air flow adjustment mechanism 22 for adjusting the air flow in the vertical direction Z is in a nominal position 155 and the horizontal air flow adjustment mechanism 24 for adjusting the air flow in the transverse direction Y is in a nominal position 135.

In this type of configuration of the air nozzle device, a nominal position of the mechanism 22 typically refers to a position of the mechanism 22 that guides the air flow essentially parallel to the XY-plane.

Analogously, in this type of configuration of the air nozzle device, a nominal position of the mechanism 24 typically refers to a position of the mechanism 24 that guides the air flow essentially parallel to the XZ-plane.

Figure 3F:
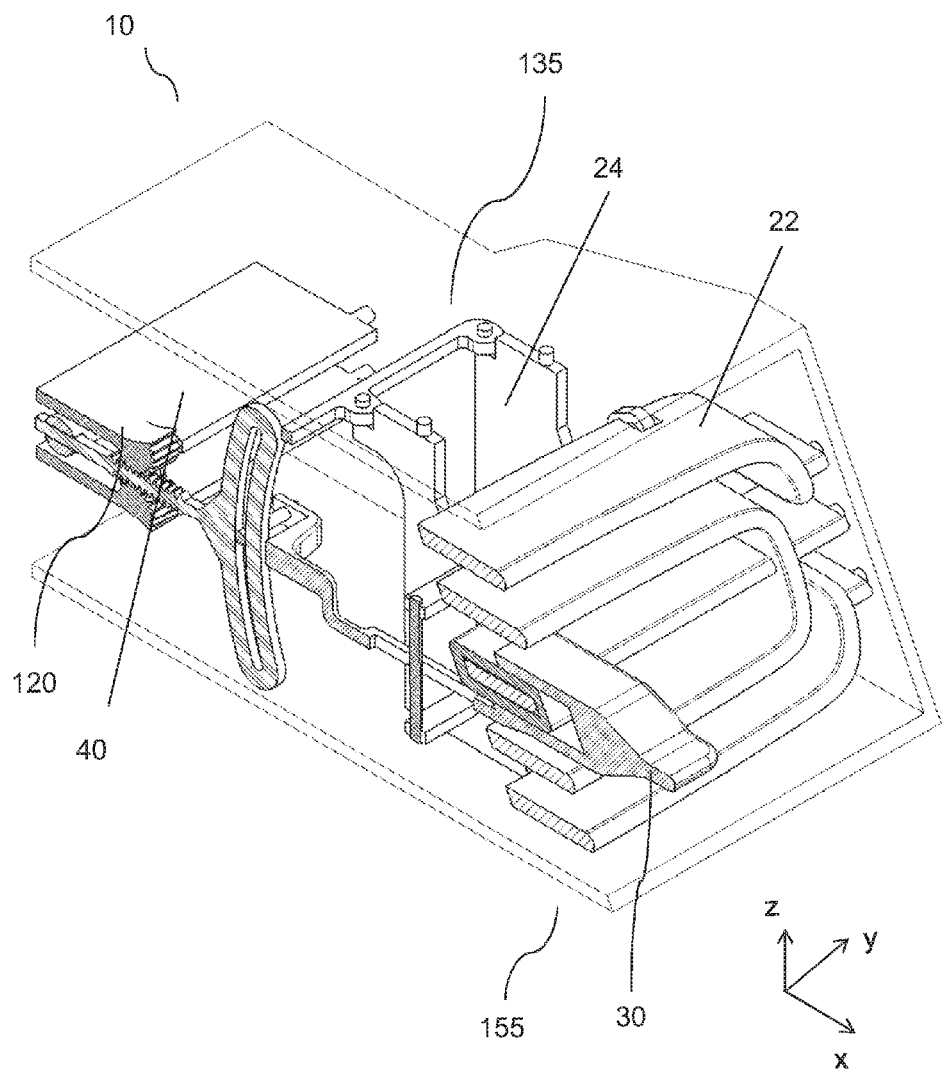
FIG. 3f is a cross-sectional view of the first example embodiment of the air nozzle device in an operational state, in which the shutoff mechanism for regulating the air flow is in an open position, the vertical air flow adjustment mechanism for adjusting the air flow in the vertical direction Z is in the nominal position and the horizontal air flow adjustment mechanism for adjusting the air flow in the transverse direction Y is in the nominal position.

FIG. 3f is a cross-sectional view of the first example embodiment of the air nozzle device in an operational state, in which the shutoff mechanism 40 for regulating the air flow is in an open position 120, the vertical air flow adjustment mechanism 22 for adjusting the air flow in the vertical direction Z is in the nominal position 155 and the horizontal air flow adjustment mechanism 24 for adjusting the air flow in the transverse direction Y is in the nominal position 135.

In other words, the operational state as described in relation to FIG. 3e only differs from the operational state as described in relation to FIG. 3f in that the shutoff mechanism 40 is adjusted from the closed position, as shown in FIG. 3e, to the open position, as shown FIG. 3f, while the position of the mechanism 22 and the position of the mechanism 24 are maintained, i.e. the position of the mechanism 22 and the position of the mechanism 24 are unaffected by the regulation of the air flow (an adjustment of the shutoff mechanism 40) also when the horizontal air flow adjustment mechanism 24 is in the nominal position 135 and the vertical air flow adjustment mechanism 22 is in the nominal position 155. As such, the operating member 30 has been moved along the longitudinal direction X, i.e. from a first position to a second position along the longitudinal direction X without affecting the positions of the mechanisms 22 and 24. Accordingly, by the configurations of the shutoff mechanism 40, the mechanism 22, the mechanism 24 and operating member 30 as described above in relation to FIGS. 1a-1d and FIG. 2, it becomes possible to regulate the air flow via the shutoff mechanism 40 independently of the position of the vertical air flow adjustment mechanism 22 and the horizontal air flow adjustment mechanism 24.

Figure 3G:
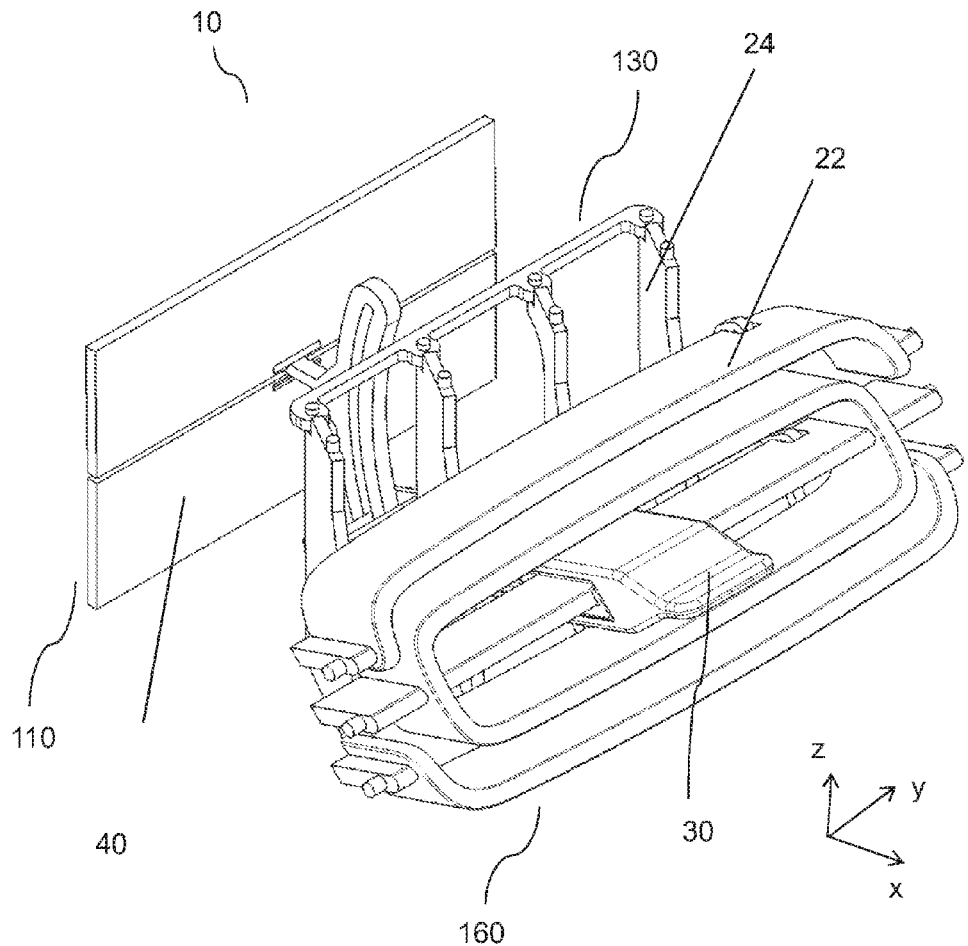
FIG. 3g illustrates the first example embodiment of the air nozzle device in an operational state, in which the shutoff mechanism for regulating the air flow is in the closed position, the vertical air flow adjustment mechanism for adjusting the air flow in the vertical direction Z is in an outer second (upper) position and the horizontal air flow adjustment mechanism for adjusting the air flow in the transverse direction Y is in the outer first transverse (right) position.

FIG. 3g illustrates the first example embodiment of the air nozzle device in an operational state, in which the shutoff mechanism 40 for regulating the air flow is in the closed position 110, the vertical air flow adjustment mechanism 22 for adjusting the air flow in the vertical direction Z is in an outer second (upper) position 160 and the horizontal air flow adjustment mechanism for adjusting the air flow in the transverse direction Y is in the outer first transverse (right) position 130.

Accordingly, in this operational state, the user-actuated member 32 has been angled upwardly as seen in the vertical direction Z to move the vertical air flow adjustment mechanism 22 to the outer second (upper) position 160. In this manner, the air flow is directed upwardly as shown in FIG. 3g. Since the user-actuated member 32 is connected to e.g. a flange of the vertical air flow adjustment mechanism 22, the adjustment of the vertical air flow adjustment mechanism 22 is changed (effected) upon a movement of the user-actuated member 32 along the vertical direction Z. In other words, the user-actuated member 32 is pivoting about a transverse axis.

Figure 3H:
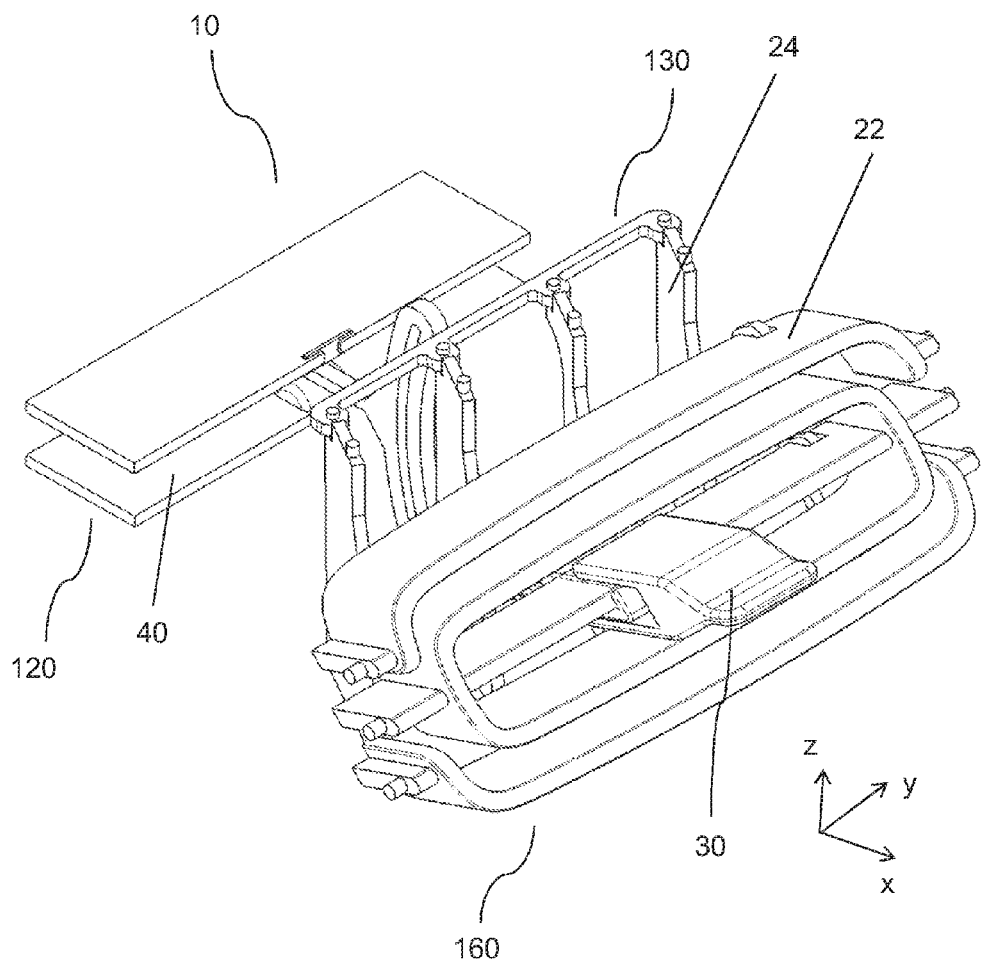
FIG. 3h illustrates the first example embodiment of the air nozzle device in an operational state, in which the shutoff mechanism for regulating the air flow is in the open position, the vertical air flow adjustment mechanism for adjusting the air flow in the vertical direction Z is in the outer second (upper) position and the horizontal air flow adjustment mechanism for adjusting the air flow in the transverse direction Y is in the outer first transverse (right) position.

FIG. 3h illustrates the first example embodiment of the air nozzle device in an operational state, in which the shutoff mechanism 40 for regulating the air flow is in the open position 120, the vertical air flow adjustment mechanism 22 for adjusting the air flow in the vertical direction Z is in the outer second (upper) position 160 and the horizontal air flow adjustment mechanism 24 for adjusting the air flow in the horizontal direction X is in the outer first transverse (right) position 130.

In other words, the operational state as described in relation to FIG. 3g only differs from the operational state as described in relation to FIG. 3h in that the shutoff mechanism 40 is adjusted from the closed position, as shown in FIG. 3g, to the open position, as shown FIG. 3h, while the position of the mechanism 22 and the position of the mechanism 24 are maintained, i.e. the position of the mechanism 22 and the position of the mechanism 24 are unaffected by the regulation of the air flow (an adjustment of the shutoff mechanism 40) also when the vertical air flow adjustment mechanism 22 is in the outer second (upper) position 160. As such, the operating member 30 has been moved along the longitudinal direction X, i.e. from a first position to a second position along the longitudinal direction X without affecting the positions of the mechanisms 22 and 24. Accordingly, by the configurations of the shutoff mechanism 40, the mechanism 22, the mechanism 24 and operating member 30 as described above in relation to FIGS. 1a-1d and FIG. 2, it becomes possible to regulate the air flow via the shutoff mechanism 40 independently of the position of the vertical air flow adjustment mechanism 22 and the horizontal air flow adjustment mechanism 24.

Figure 3I:
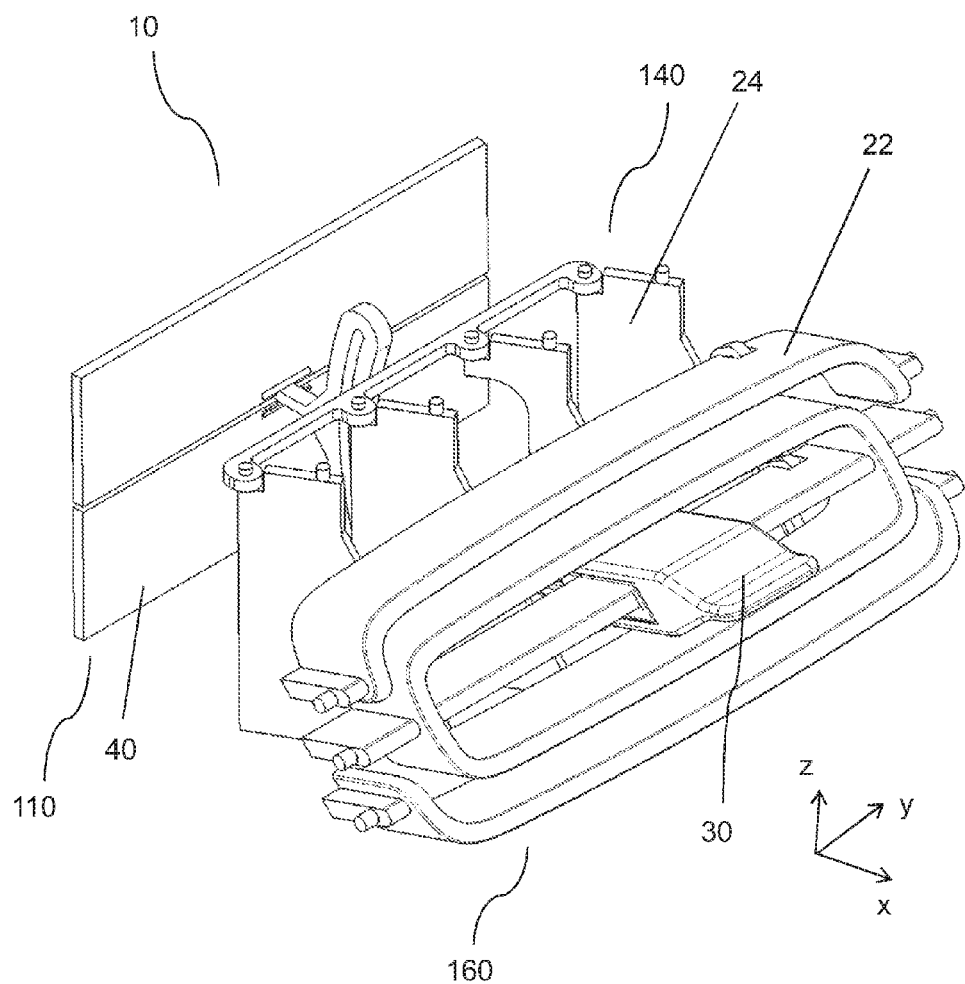
FIG. 3i illustrates the first example embodiment of the air nozzle device in an operational state, in which the shutoff mechanism for regulating the air flow is in the closed position, the vertical air flow adjustment mechanism for adjusting the air flow in the vertical direction Z is in the outer second (upper) position and the horizontal air flow adjustment mechanism for adjusting the air flow in the transverse direction Y is in the outer second transverse (left) position.

FIG. 3i illustrates the first example embodiment of the air nozzle device in an operational state, in which the shutoff mechanism 40 for regulating the air flow is in the closed position 110, the vertical air flow adjustment mechanism 22 for adjusting the air flow in the vertical direction Z is in the outer second (upper) position 160 and the horizontal air flow adjustment mechanism 24 for adjusting the air flow in the transverse direction Y is in the outer second transverse (left) position 140.

Figure 3J:
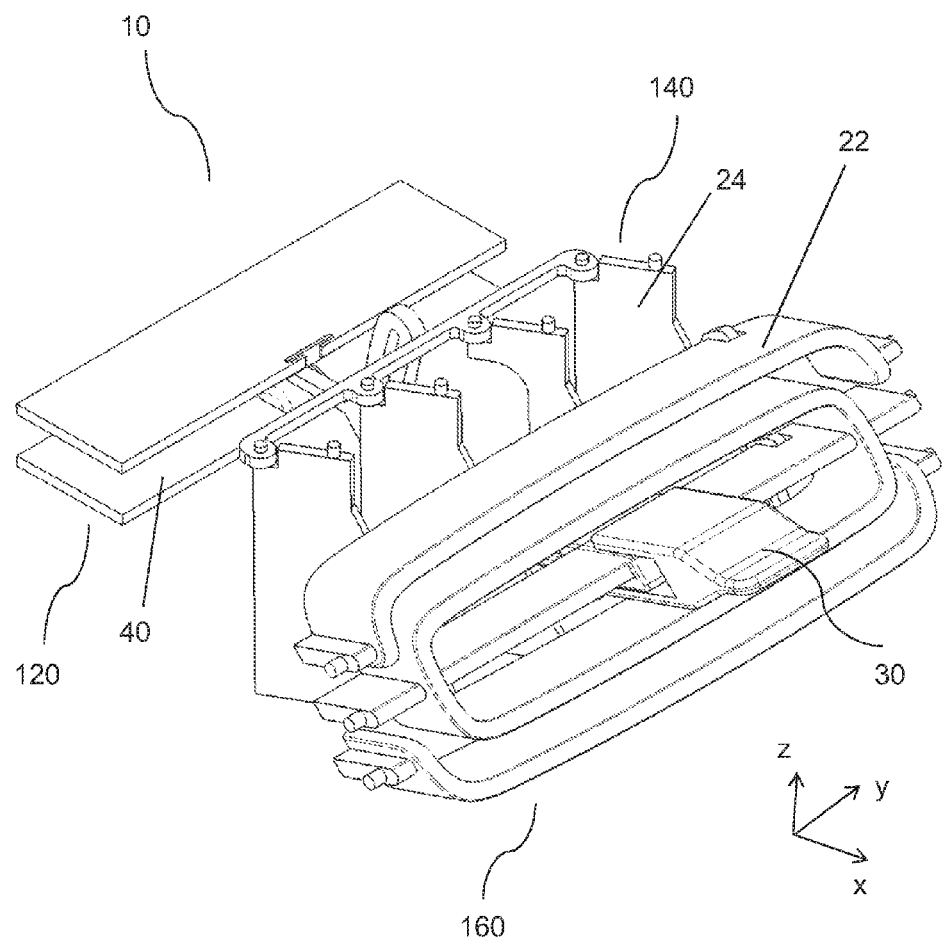
FIG. 3j illustrates the first example embodiment of the air nozzle device in an operational state, in which the shutoff mechanism for regulating the air flow is in the open position, the vertical air flow adjustment mechanism for adjusting the air flow in the vertical direction Z is in the outer second (upper) position and the horizontal air flow adjustment mechanism for adjusting the air flow in the transverse direction Y is in the outer second transverse (left) position.

FIG. 3j illustrates the first example embodiment of the air nozzle device in an operational state, in which the shutoff mechanism 40 for regulating the air flow is in the open position 120, the vertical air flow adjustment mechanism 22 for adjusting the air flow in the vertical direction Z is in the outer second (upper) position 160 and the horizontal air flow adjustment mechanism 24 for adjusting the air flow in the transverse direction Y is in the outer second transverse (left) position 140.

In other words, the operational state as described in relation to FIG. 3i only differs from the operational state as described in relation to FIG. 3j in that the shutoff mechanism 40 is adjusted from the closed position, as shown in FIG. 3i, to the open position, as shown FIG. 3j, while the position of the mechanism 22 and the position of the mechanism 24 are maintained, i.e. the position of the mechanism 22 and the position of the mechanism 24 are unaffected by the regulation of the air flow (an adjustment of the shutoff mechanism 40) also when the horizontal air flow adjustment mechanism 24 is in the outer second transverse (left) position 140 and the vertical air flow adjustment mechanism 22 is in the outer second (upper) position 160. As such, the operating member 30 has been moved along the longitudinal direction X, i.e.

from a first position to a second position along the longitudinal direction X without affecting the positions of the mechanisms 22 and 24. Accordingly, by the configurations of the shutoff mechanism 40, the mechanism 22, the mechanism 24 and operating member 30 as described above in relation to FIGS. 1a-1d and FIG. 2, it becomes possible to regulate the air flow via the shutoff mechanism 40 independently of the position of the vertical air flow adjustment mechanism 22 and the horizontal air flow adjustment mechanism 24.

Moreover, it is to be noted from FIG. 3a and FIG. 3c, that the horizontal air flow adjustment mechanism 24 can be adjusted independently of the position of the vertical air flow adjustment mechanism 22. That is, the horizontal air flow adjustment mechanism 24 is adjusted from the outer first transverse (left) position 130 to the outer second transverse (left) position 140, while the position of the vertical air flow adjustment mechanism 22 is maintained in the outer first (lower) position 150. Furthermore, the horizontal air flow adjustment mechanism 24 can be adjusted independently on the position of the shutoff mechanism 40, as is illustrated from FIGS. 3a and 3c and/or FIGS. 3b and 3d. That is, FIGS. 3a and 3c reflect the shutoff mechanism in the closed position, while FIGS. 3b and 3d reflect the shutoff mechanism in the open position.

Analogously, FIG. 3a and FIG. 3g illustrates that the vertical air flow adjustment mechanism 22 can be adjusted independently of the position of the horizontal air flow adjustment mechanism 24. That is, the vertical air flow adjustment mechanism 22 is adjusted from the outer first (lower) position 150 to the outer second (upper) position 160, while the position of the horizontal air flow adjustment mechanism 24 is maintained in the outer first transverse (left) position 130.

Furthermore, the vertical air flow adjustment mechanism 22 can be adjusted independently on the position of the shutoff mechanism 40, as is illustrated from FIGS. 3a and 3g and/or FIGS. 3b and 3i. That is, FIGS. 3a and 3g reflect the shutoff mechanism in the closed position, while FIGS. 3b and 3h reflect the shutoff mechanism in the open position.

It should therefore be readily appreciated from the FIGS. 3a through 3j, and the explanations above, that the user-actuated manual mechanism 32 of the operating member 30 is capable of independently controlling any one of the shutoff mechanism 40, the vertical air flow adjustment mechanism 22 and the horizontal air flow adjustment mechanism 24 to set the air nozzle device in a desired configuration so as to allow a user to regulate and direct the air flow depending on the user's wishes by manipulation of the operating member 30 via the user-actuated manual mechanism 32.

As mentioned above, the air flow adjustment arrangement 20 typically, although not strictly required, comprises a vertical air flow adjustment mechanism 22 for adjusting the air flow in the vertical direction Z and a horizontal air flow adjustment mechanism 24 for adjusting the air flow in the transverse direction Y. In another example embodiment (not shown), the vertical air flow adjustment mechanism 22 and the horizontal air flow adjustment mechanism 24 may be provided in a single unit, i.e. being integrated into one single unit. Alternatively, or in addition, the function of the vertical air flow adjustment mechanism 22 and the function of the horizontal air flow adjustment mechanism 24 may be combined in one single unit.

It should be readily appreciated that the ultimate dimensions and the materials of the device and its components are selected based on the overall space available in the vehicle compartment, e.g. in the dashboard. However, as an example, the components of the device can be made of a suitable a plastics, a metal such as stainless steel of a combination of plastics and metal. E.g. some parts of the device can be made of metal and other part of the device may be made by plastics.

As exemplified by the example embodiments above in relation to the FIGS. 1a through 3j, it becomes possible to provide a multi-functional air nozzle device in the sense that the configuration of the device allows for an independent adjustment of the air flow in the vertical direction Z, an independent adjustment of the air flow in the transverse direction Y and an independent regulation of the air flow level. In this manner, the first linkage member is movably arranged to the second linkage member such that a movement of the shutoff mechanism is effected by a movement of the operating member in a longitudinal direction X and an adjustment of the air flow adjustment arrangement is effected by a movement of the operating member in a transverse direction Y and/or vertical direction Z depending on transverse or vertical air flow adjustment. To this end, the device provides a multi-functional solution which is both compact and robust while allowing for an integrated push/pull function via the operating member that is operable from the outside of the device.

Although the invention has been described in relation to specific combinations of components, it should be readily appreciated that the components may be combined in other configurations as well which is clear for the skilled person when studying the present application. Thus, the above description of the example embodiments of the present invention and the accompanying drawings are to be regarded as a non-limiting example of the invention and the scope of protection is defined by the appended claims. Any reference sign in the claims should not be construed as limiting the scope.

The invention claimed is:

1. An air nozzle device for a vehicle comprising:
    a housing defining an interior volume and having:
        an air inlet at one side,
        an air discharge opening at a second side, and
        an air flow channel through the housing for transporting an air flow between the air inlet and the air discharge opening,
    the device further comprising:
        a moveable operating member,
        a shutoff mechanism, and
        an air flow adjustment arrangement,
    said shutoff mechanism being configured to regulate the air flow and said air flow adjustment arrangement being pivotably connected to said housing and configured to adjust a direction of the air flow in a transverse direction (Y) and in a vertical direction (Z),
    wherein said operating member comprises a user-actuated manual mechanism, a first linkage member and a second linkage member,
    said first linkage member being connected to the user-actuated manual mechanism at one end and the second linkage member at a second end,
    wherein said first linkage member comprises a channel or groove to accommodate a part of a guiding pin of the air flow adjustment arrangement,
    wherein the channel or groove extends at least partly in a longitudinal direction (X) to permit a movement of the first linkage member along the longitudinal direction (X) independently of the position of the air flow adjustment arrangement, wherein the guiding pin is configured, when received in at least a part of the channel or groove of the first linkage member, to alter the air flow arrangement by a movement of the first linkage member in the transverse direction (Y) independently of the position of the shutoff mechanism, wherein said first linkage member further comprises a linking pin arranged at the second end and said second linkage member comprises a channel or groove to accommodate a part of the linking pin of the first linkage member, wherein the linking pin has a length in the transverse direction (Y) and the channel or groove extends at least partly in the vertical direction (Z) to permit a movement of the first linkage member along the vertical direction (Z) independently of the position of the shutoff mechanism, such that the linking pin is freely movable in the vertical direction (Z) of the recess and configured to move freely along the transverse direction (Y), while a push or pull movement of the user-actuated manual mechanism and the first linkage member in the longitudinal direction (X) is translated into a movement of the second linkage member to effect a regulation of the air flow by the shutoff mechanism independently of the position of the air flow adjustment arrangement, wherein said user-actuated manual mechanism is arranged downstream of said air flow adjustment arrangement to permit manual operation of the air flow adjustment arrangement and the shutoff mechanism from the outside of the device.

2. The air nozzle device according to claim 1, wherein the user-actuated manual mechanism is slidably engaged to said air flow adjustment arrangement and movable along the longitudinal direction (X) and the transverse direction (Y) upon operation of a user.

3. The air nozzle device according to claim 1, wherein the first linkage member is arranged through a passage of the air flow adjustment arrangement and connected to the second linkage member upstream from said air flow adjustment arrangement.

4. The air nozzle device according to claim 1, wherein said air flow adjustment arrangement comprises a vertical air flow adjustment mechanism for adjusting the air flow in the vertical direction (Z) and a horizontal air flow adjustment mechanism for adjusting the air flow in the transverse direction (Y).

5. The air nozzle device according to claim 4, wherein the vertical air flow adjustment mechanism is independently pivotably connected to the housing via at least one pivoting connection configured to permit said vertical air flow adjustment mechanism to pivot about a transverse pivot axis.

6. The air nozzle device according to claim 5, wherein the vertical air flow adjustment mechanism comprises a set of spaced apart air directing elements pivotably arranged about the pivoting connections.

7. The air nozzle device according to claim 4, wherein the user-actuated manual mechanism is slidably engaged to said vertical air flow adjustment mechanism to permit operation of the user-actuated manual mechanism along the longitudinal direction (X) and/or the transverse direction (Y), upon operation of a user, independently of the position of the vertical air flow adjustment mechanism, while an adjustment of the vertical air flow adjustment mechanism is effected by a movement of the user-actuated manual mechanism in the vertical direction (Z).

8. The air nozzle device according to claim 4, wherein the horizontal air flow adjustment mechanism is independently pivotably connected to the housing via at least one pivoting connection configured to permit said horizontal air flow adjustment mechanism to pivot about a vertical pivot axis.

9. The air nozzle device according to claim 8, wherein the horizontal air flow adjustment mechanism comprises a set of spaced apart air directing elements pivotably arranged about the pivoting connections.

10. The air nozzle device according to claim 8, wherein the guiding pin of the air flow adjustment arrangement is arranged on said horizontal air flow adjustment mechanism.

11. The air nozzle device according to claim 4, wherein, when the air flow adjustment arrangement comprises the vertical air flow adjustment mechanism and the horizontal air flow adjustment mechanism, the user-actuated manual mechanism of the operating member is capable of independently adjusting the vertical air flow adjustment mechanism by a movement of the first linkage member along the vertical direction (Z), independently adjusting the horizontal air flow adjustment mechanism by a movement of the first linkage member along the transverse direction (Y), and independently regulating the air flow via the shutoff mechanism by a movement of the operating member along the longitudinal direction (X).

12. The air nozzle device according to claim 4, wherein, when the air flow adjustment arrangement comprises the vertical air flow adjustment mechanism and the horizontal air flow adjustment mechanism, the first linkage member is configured to cooperate with the second linkage member to adjust the shutoff mechanism upon a movement of the first linkage member in a longitudinal direction (X) and further configured to cooperate with the guiding pin to adjust the horizontal air flow adjustment mechanism upon a movement of the first linkage member in the transverse direction (Y).

13. The air nozzle device according to claim 4, wherein, when the air flow adjustment arrangement comprises the vertical air flow adjustment mechanism and the horizontal air flow adjustment mechanism, the second linkage member is configured to adjust the position of the shutoff mechanism upon a movement of the second linkage member in the longitudinal direction (X), and further configured to remain in position upon a movement of the first linkage member in the transverse direction (Y) and/or in the vertical direction (Z).

14. The air nozzle device according to claim 1, wherein the shutoff mechanism is configured to move between an open position, defining a passage for the air flow in the air flow channel, and a closed position, defining an essentially air tight configuration against the inner surfaces of the housing, upon a movement of the moveable operating member in the longitudinal direction (X).

15. The air nozzle device according to claim 14, wherein the shutoff mechanism comprises a set of blades being moveable between the open position in which the set of blades forms a passage for the air flow in the air flow channel and the closed position in which the set of blades are adapted to form an essentially air tight configuration against the inner surfaces of the housing.

16. The air nozzle device according to claim 1, wherein the shutoff mechanism is connected to the housing via the operating member.

17. The air nozzle device according to claim 1, wherein the user-actuated manual mechanism of the operating member is capable of opening/closing the shutoff mechanism via a movement of the first linkage member and the second linkage member along the longitudinal direction (X).

18. A vehicle compartment member comprising at least one of a dashboard, door trim, or a console, wherein the vehicle compartment member comprises the air nozzle device according to claim 1.

19. A vehicle comprising a vehicle compartment member according to claim 18.

20. An air nozzle device for a vehicle comprising:
- a housing defining an interior volume and having a first side and a second side, the housing including:
  - an air inlet at the first side;
  - an air discharge opening at the second side; and
  - an air flow channel through the interior volume of the housing for transporting an air flow between the air inlet and the air discharge opening;
- an air flow adjustment arrangement pivotably connected to said housing and to adjust a direction of the air flow in a transverse direction (Y) and in a vertical direction (Z), the airflow adjustment arrangement including a guiding pin extending substantially in the vertical direction (Z);
- a moveable operating member comprising a user-actuated manual mechanism arranged downstream of said air flow adjustment arrangement;
- a shutoff mechanism disposed in the housing upstream of said air flow adjustment arrangement;
- a first linkage member having a first end, a second end, and a channel or groove disposed between the first end and the second end, wherein:
  - the first end of the first linkage member is connected to the user-actuated manual mechanism;
  - the second end of the first linkage comprises a linking pin;
  - the channel or groove extends in a longitudinal direction (X) at least partly along a length of the first linkage member; and
  - the guiding pin is configured, when received in at least a part of the channel or groove of the first linkage member, to alter the air flow arrangement by a movement of the first linkage member in the transverse direction (Y) independently of the position of the shutoff mechanism;
- a second linkage member connecting the first linkage member and the shutoff mechanism, the second linkage member comprising:
  - a first end having a channel or groove extending in substantially the transverse direction (Y), the linking pin of the second end of the first linkage member being slidably received in the channel or groove at the first end of the second linkage member; and
  - a second end connected to the shutoff mechanism to regulate the air flow responsive to a push or pull movement of the user-actuated manual mechanism in the longitudinal direction (X).

* * * * *